(12) United States Patent
Minoda et al.

(10) Patent No.: US 7,729,227 B2
(45) Date of Patent: Jun. 1, 2010

(54) DIFFRACTIVE ELEMENT, METHOD OF MANUFACTURING THE SAME, OPTICAL PICKUP DEVICE, AND OPTICAL DISC APPARATUS

(75) Inventors: Takatoshi Minoda, Kikuchi-gun (JP); Noriaki Seki, Arao (JP); Eizo Ono, Kikuchi (JP)

(73) Assignee: Panasonic Corporation, Osaka (JP)

( * ) Notice: Subject to any disclaimer, the term of this patent is extended or adjusted under 35 U.S.C. 154(b) by 1157 days.

(21) Appl. No.: 11/344,558

(22) Filed: Feb. 1, 2006

(65) Prior Publication Data

US 2006/0176559 A1 Aug. 10, 2006

(30) Foreign Application Priority Data

Feb. 4, 2005 (JP) ............................. 2005-028760
Dec. 2, 2005 (JP) ............................. 2005-349043

(51) Int. Cl.
G11B 7/00 (2006.01)
(52) U.S. Cl. ............................. 369/112.03; 369/112.05
(58) Field of Classification Search ............ 369/112.03, 369/112.05
See application file for complete search history.

(56) References Cited

U.S. PATENT DOCUMENTS

| 5,905,700 | A | 5/1999 | Best |
| 6,157,504 | A | 12/2000 | Yamada |
| 6,618,116 | B1* | 9/2003 | Murata et al. ............... 349/201 |
| 2004/0094699 | A1 | 5/2004 | Goto et al. |
| 2004/0125454 | A1* | 7/2004 | Kawasaki et al. ........... 359/569 |
| 2006/0033913 | A1 | 2/2006 | Sato |

FOREIGN PATENT DOCUMENTS

| JP | 01-215070 | 8/1989 |
| JP | 07-201077 | 8/1995 |
| JP | 2000-258605 | 9/2000 |
| JP | 2001-183501 | 7/2001 |
| JP | 2002318306 | 10/2002 |
| JP | 2002350625 | 12/2002 |
| WO | 2004/097816 | 11/2004 |

OTHER PUBLICATIONS

Japanese Office Action dated Oct. 22, 2008 with English translation thereof.

* cited by examiner

*Primary Examiner*—Lixi Chow
(74) *Attorney, Agent, or Firm*—Dickinson Wright PLLC

(57) ABSTRACT

There is provided a diffractive element including a first member 2, which includes a first resin 2a and has a predetermined refractive index, and a second member 3, which has the same refractive index as the first member 2 having the predetermined refractive index in one wavelength of light and has a refractive index different from the first member 2 having the predetermined refractive index in the other wavelength of light. The first member 2 and the second member 3 are alternately arranged within an incidence plane of the two wavelengths of light, thereby constituting a diffraction grating. The second member 3 includes a second resin 3a to dissolve an organic matter 5 having optical absorption in a predetermined wavelength range at a molecular level, whereby the refractive index of the second member 3 is formed.

17 Claims, 24 Drawing Sheets

KEPT UNDER HEATING

ULTRAVIOLET RAYS

KEPT UNDER HEATING

DISSOLVED

KEPT UNDER HEATING

ULTRAVIOLET RAYS

KEPT UNDER HEATING

ULTRAVIOLET RAYS

KEPT UNDER HEATING

REFRACTIVE INDEX n1 (λ1) ≅ REFRACTIVE INDEX n2 (λ1)

REFRACTIVE INDEX n1 (λ2) ≠ REFRACTIVE INDEX n2 (λ2)

DIFFRACTIVE ELEMENT, METHOD OF MANUFACTURING THE SAME, OPTICAL PICKUP DEVICE, AND OPTICAL DISC APPARATUS

BACKGROUND OF THE INVENTION

1. Field of the Invention

The present invention relates to a diffractive element which selectively diffract different wavelengths, to a method of manufacturing the diffractive element, and to an optical pickup device and an optical disc apparatus, which are equipped with the diffractive element.

2. Description of the Related Art

Conventionally, in digital versatile discs (DVDs), recording or reproducing of information is performed by a wavelength $\lambda 1$ (about 650 nm) of laser light. On the other hand, in compact discs (CDs), recording or reproducing of information is performed by a wavelength $\lambda 2$ (about 780 nm) of laser light. In optical disc apparatuses which perform recording or reproducing on these two types of discs, a dual-wavelength laser light source which emits two wavelengths of laser light has been used. Diffractive elements with wavelength selectivity which transmit the wavelength $\lambda 1$ of light for DVDs without any change as one beam without responding thereto and which split the wavelength $\lambda 2$ of light for CDs (while serving as a diffractive element for this wavelength of light) into three beams have been needed for such a dual-wavelength laser light source. The diffractive elements having wavelength selectivity are exemplified in JP-A-2002-318306, JP-A-2002-360625, and US Publication No. 2004-0094699.

FIG. 24 is a plan view showing a diffractive element according to the related art. FIG. 24A shows that a wavelength $\lambda 1$ of light for DVDs transmits through the diffractive element, and FIG. 24B shows that a wavelength $\lambda 2$ of light for CDs transmits through the diffractive element.

As shown in FIG. 24, a first transparent 101 is a substrate made of optical glass, etc. A second member 103 includes a red organic pigment 105 and a resin 103a containing the organic pigment 105, and forms irregular shapes on the first transparent substrate 101. A first member 102 includes a resin 102a which is filled in the irregularities of the second member 103. The first member 102 and the second member 103 constitutes a diffraction grating. The second transparent substrate 104 is a substrate made of optical glass, etc., and protects the first member 102 and the second member 103. The organic pigment 105 has optical absorption in a range having a shorter wavelength than the wavelength $\lambda 1$, but does not have optical absorption in the wavelength $\lambda 1$ and the wavelength $\lambda 2$.

It is known that the refractive index of general materials changes according to wavelengths. It is also known that, when a material absorbs light in a certain wavelength range, the refractive index of the material changes rapidly in a wavelength range having the optical absorption and in a wavelength range in the vicinity thereof. This phenomenon is referred to as abnormal dispersion phenomenon. In Patent Document 1 and Patent Document 2, the abnormal dispersion is given to only the second member 103, using the organic pigment 105. And, by greatly changing the refractive index of the second member 103 in the wavelength $\lambda 1$ and the wavelength $\lambda 2$, the refractive index n1 ($\lambda 1$) of the first member 102 in the wavelength $\lambda 1$ and the refractive index n2 ($\lambda 1$) of the second member 103 in the wavelength $\lambda 1$ are made equal to each other, and the refractive index n1 ($\lambda 2$) of the first member in the wavelength $\lambda 2$ and the refractive index n2 ($\lambda 2$) of the second member in the wavelength $\lambda 2$ are made different equal to each other. Therefore, the wavelength $\lambda 1$ of light is transmitted without any change as one beam because there is no difference in refractive index between the first member and the second member and the wavelength $\lambda 2$ of light (here, the diffractive element serves as a diffractive element for this wavelength of light) is split into three beams because there is any difference in the refractive index. In other words, it is possible to obtain a diffractive element having wavelength selectivity.

Meanwhile, since the pigment is dispersed and suspended in particles in the second member, incident light is dispersed. Therefore, it is difficult to increase the transmittance of the second member including an organic pigment, in the wavelength $\lambda 1$ of light for DVDs and the wavelength $\lambda 2$ of light for CDs. Therefore, the light for DVDs and CDs which transmits through the diffractive element may be lost. It has been advanced to cope with miniaturizing the optical disc apparatus or the optical pickup device and increasing its processing speed to a high speed Increasing their speed to a high speed requires increasing the output of laser light to be radiated on an optical disc. Therefore, it is necessary to minimize a loss caused by the diffractive element.

SUMAMRY OF THE INVENTION

The invention has been made to solve the above-mentioned problems. It is therefore an object of the invention to provide a diffractive element on which two wavelengths of light are incident from a light source and that transmits the one wavelength of light and splits the other wavelength of light and emits the split light to an optical disc, and which has high transmittance in the respective wavelengths, and to provide an optical pickup device and an optical disc apparatus to meet attainment of a high speed by mounting the diffracting element.

In order to achieve the above object, there is provided a diffractive element on which two wavelengths of light are incident from a light source and that transmits the one wavelength of light and splits the other wavelength of light and emits the split light to an optical disc. The diffractive element includes a first member including a first resin and having a predetermined refractive index, and a second member having the same refractive index as the first member having the predetermined refractive index in the one wavelength of light and having a refractive index different from the first member having the predetermined refractive index in the other wavelength of light. The first member and the second member are alternately arranged in a right-and-left direction with respect to an incidence direction of the two wavelengths of light, thereby constituting a diffraction grating. The second member includes a second resin to dissolve an organic matter having optical absorption in a predetermined wavelength range at a molecular level, whereby the refractive index of the second member is formed.

The second member transmits a wavelength $\lambda 1$ of light for DVDs and a wavelength $\lambda 2$ of light for CDs and dissolves an organic matter having optical absorption in a predetermined wavelength range at a molecular level. A dye of the organic matter has optical absorption in the wavelength of visible light. Accordingly, since the organic matter is dissolved at a molecular level in the second resin that is a solvent and thus incident light is dispersed, the transmittance in the wavelength $\lambda 1$ and the wavelength $\lambda 2$ can be increased.

There may also be provided a diffractive element on which two wavelengths of light are incident from a laser light source and that transmits the one wavelength of light and splits the other wavelength of light and emits the split light to an optical disc. The diffractive element includes a first member including a first resin and having a predetermined refractive index, and a second member having optical absorption in a predetermined wavelength range, and thereby having the same refractive index as the first member having the predetermined refractive index in the one wavelength of light and has a refractive index different from the first member having the predetermined refractive index in the other wavelength of light. The first member and the second member are alternately arranged within an incidence plane of the two wavelengths of light, thereby constituting a diffraction grating. The second member includes a second resin, and the second resin itself has optical absorption in the predetermined wavelength range.

Since the second resin itself has optical absorption in the predetermined wavelength range, difference between the refractive indexes of the second resin in the wavelength $\lambda 1$ and the wavelength $\lambda 2$ can be made larger than that of the first resin which does not have optical absorption. Also, since no particles of the second resin are dispersed and suspended in the second member and therefore light is hardly dispersed, the transmittance in the wavelength $\lambda 1$ and the wavelength $\lambda 2$ can be increased.

Therefore, the diffractive element of the invention has a high transmittance in the wavelength $\lambda 1$ and the wavelength $\lambda 2$, and can transmit either the wavelength $\lambda 1$ of light or the wavelength $\lambda 2$ of light, and diffract and split the other wavelength of light. Since the optical pickup device equipped with the diffractive element of the invention has a high transmittance in the wavelength $\lambda 1$ and the wavelength $\lambda 2$, and can increase the output of laser light to be radiated onto an optical disc, it can meet attainment of a high speed. Therefore, the optical disc apparatus equipped with the optical pickup device can also meet attainment of a high speed.

BRIEF DESCRIPTION OF THE DRAWINGS

FIG. 1 shows the structure of a diffractive element of Embodiment 1 of the invention wherein FIG. 1A shows that a wavelength $\lambda 1$ of light transmits through the diffractive element, and FIG. 1B shows that a wavelength $\lambda 2$ of light transmits through the diffractive element.

FIG. 5 shows the procedure of fabricating a diffractive element of Embodiment 1 wherein FIG. 5A shows a first transparent substrate, FIG. 5B shows that a first member has been coated and cured on the first transparent substrate, FIG. 5C shows that the coated first member is irradiated with ultraviolet rays through a mask pattern, FIG. 5D shows that irregular shapes have been made in the first member, FIG. 5E shows that a second member has been filled, and FIG. 5F shows that the second member has been cured by keeping a second transparent substrate under heating after the second transparent substrate is superimposed on the second member.

FIG. 6 shows the procedure of fabricating a diffractive element of Embodiment 2 wherein FIG. 6A shows a first transparent substrate, FIG. 6B shows that a second member has been coated and cured on the first transparent substrate, FIG. 6C shows that the coated second member is irradiated with ultraviolet rays through a mask pattern, FIG. 6D shows that irregular shapes have been made in the second member, FIG. 6E shows that a first member has been filled, and FIG. 6F shows that the first member has been cured by keeping a second transparent substrate under heating after the second transparent substrate is superimposed on the first member.

FIG. 7 shows the procedure of fabricating a diffractive element of Embodiment 3 wherein FIG. 7A shows a second resin having a dissolved organic matter, FIG. 7B shows a first transparent substrate, FIG. 7C shows that a second member has been coated and cured on the first transparent substrate, FIG. 7D shows that the coated second member is irradiated with ultraviolet rays through a mask pattern, and FIG. 7E shows that a diffraction grating has been formed by radiation/non-radiation of ultraviolet rays.

FIG. 10 shows the procedure of fabricating a diffractive element of Embodiment 5 wherein FIG. 10A shows a first transparent substrate, FIG. 10B shows that a first member has been coated and cured on the first transparent substrate, FIG. 10C shows that the coated first member is irradiated with ultraviolet rays through a mask pattern, FIG. 10D shows that irregular shapes has been made in the first member, FIG. 10E shows that a second member has been filled, and FIG. 10F shows that the second member has been cured by keeping a second transparent substrate under heating after the second transparent substrate is superimposed on the second member.

FIG. 24 shows the structure of a diffractive element according to the related art wherein FIG. 24A shows that a wavelength λ1 of light for DVDs transmits through the diffractive element, and FIG. 24B shows that a wavelength λ2 of light for CDs transmits through the diffractive element.

BRIEF DESCRIPTION OF THE PREFERRED EMBODIMENNTS

Figure 1:
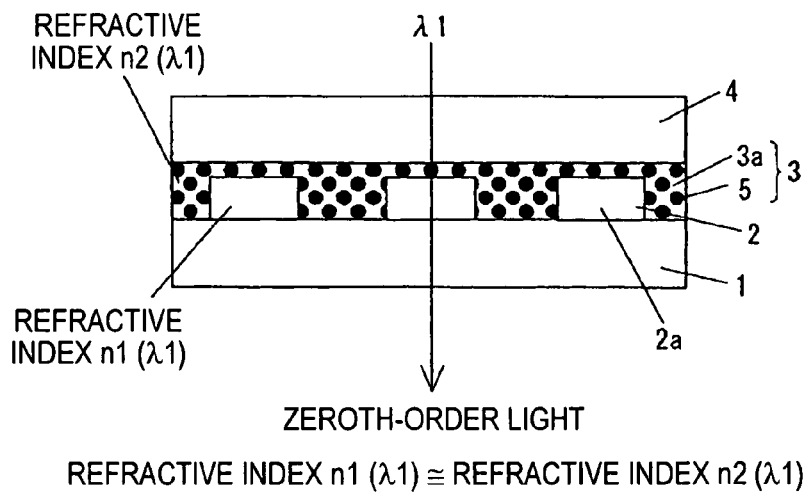
Figure 1:
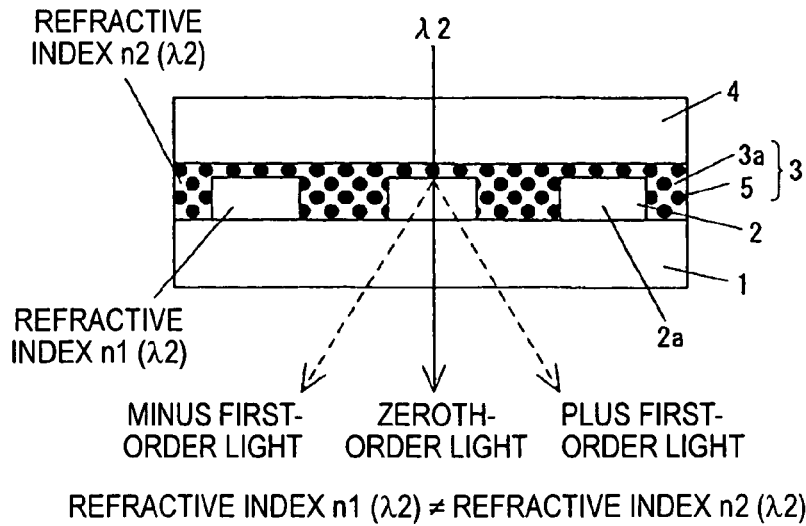

According to one aspect o the invention, there is provided a diffractive element on which two wavelengths of light are incident from a light source and that transmits the one wavelength of light and splits the other wavelength of light and emits the split light to an optical disc. The diffractive element includes a first member including a first resin and having a predetermined refractive index, and a second member having the same refractive index as the first member having the predetermined refractive index in the one wavelength of light and having a refractive index different from the first member having the predetermined refractive index in the other wavelength of light. The first member and the second member are alternately arranged in a right-and-left direction with respect to an incidence direction of the two wavelengths of light, thereby constituting a diffraction grating. The second member includes a second resin to dissolve an organic matter having optical absorption in a predetermined wavelength range at a molecular level, whereby the refractive index of the second member is formed.

Therefore, the diffractive element has a high transmittance in both two wavelengths of light, and can transmit one wavelength of light and diffract and split the other wavelength of light.

Preferably, the diffractive element is a diffractive element in which the one wavelength of light is laser light for DVDs.

Since the light for DVDs is not split into three beams, the loss can be suppressed. Therefore, the intensity of light which reaches an optical disc can be increased, and attainment of a high speed can be met.

Preferably, the diffractive element is a diffractive element in which the other wavelength of light is laser light for DVDs.

Since the light for CDs can be surely split into three beams, signals for stable tracking control can be obtained.

Preferably, the diffractive element is a diffractive element in which the organic matter is a dye.

Therefore, the diffractive element has a high transmittance in both two wavelengths of light, and can transmit one wavelength of light and diffract and split the other wavelength of light. Also, since the diffractive element is colored according to wavelengths of the light to be absorbed, it can be easily distinguished from other parts during manufacture.

Preferably, the diffractive element is a diffractive element in which the second member is cured without using ultraviolet rays.

Ultraviolet rays often destruct the structure of the organic matter partially. Therefore, the property of the organic matter having optical absorptance in a predetermined wavelength range may be lost. However, since the second member is cured without using ultraviolet rays, the structure of the organic matter is not destructed, and thus the optical absorption in a predetermined wavelength range is maintained without any change.

Preferably, the diffractive element is a diffractive element in which the second member is cured by heat.

Since the second member is cured only by heating without using ultraviolet rays, the optical absorption of the organic matter in a predetermined wavelength range can be maintained without any change.

Preferably, the diffractive element is a diffractive element in which the first resin of the first member is a resin which has not optical absorption in the predetermined wavelength range, whereby the predetermined refractive index of the first member is formed.

Since the first resin does not have optical absorption in a predetermined wavelength range, the difference between the refractive indexes of the first member in the two wavelengths of light is small. Therefore, by combining the first member with the second member which can increase the difference between the refractive indexes in two wavelengths of light, the refractive index of the first member in the one wavelength of light can be made equal to that of the second member, and the refractive index of the first member in the other wavelength of light can be made different from that of the second member.

Preferably, the diffractive element is a diffractive element in which the second member includes a dye which has optical absorption in the predetermined wavelength range, whereby the predetermined refractive index of the second member is formed.

On account of the dye having optical absorption in the predetermined wavelength range, the second member has a large refractive index difference in two wavelengths of light. Therefore, by combining the second member with the first member having a small refractive index difference in the two wavelengths of light, the refractive index of the second member in the one wavelength of light can be made equal to that of the first member, and the refractive index of the second member in the other wavelength of light can be made different from that of the first member.

Preferably, the diffractive element is a diffractive element in which the predetermined wavelength range is a range having a shorter wavelength than the wavelength of a shorter wavelength of light of the two wavelengths of light.

A shorter wavelength of light of the two wavelengths of light changes the refractive index of the second member more greatly. Therefore, the diffractive element has a high transmittance in both two wavelengths of light, and can transmit one wavelength of light and diffract and split the other wavelength of light.

Preferably, the diffractive element is a diffractive element in which the predetermined wavelength range is a range having a longer wavelength than the wavelength of a longer wavelength of light of the two wavelengths of light.

A longer wavelength of light of the two wavelengths of light changes the refractive index of the second member more greatly. Therefore, the diffractive element has a high transmittance in both two wavelengths of light, and can transmit one wavelength of light and diffract and split the other wavelength of light.

Preferably, the diffractive element is a diffractive element in which the maximum value of differences between the optical absorptance of the second member and the optical absorptance of the first member by optical absorption of the organic matter in the predetermined wavelength range is 50% or more.

Therefore, the difference between the refractive indexes of the second member in the two wavelengths of light can be made sufficiently larger than the difference between the refractive indexes of the first member in the two wavelengths of light. Therefore, the effect of having the same refractive indexes in the one wavelength of light and having different refractive indexes in the other wavelength of light appears prominently. Accordingly, the diffractive element can sufficiently exhibit its function as a diffractive element having wavelength selectivity.

Preferably, the diffractive element is a diffractive element which further includes a first transparent substrate and a second transparent substrate, and in which the diffraction grating is formed on the first transparent substrate, and the diffraction grating is inserted between the first transparent substrate and the second transparent substrate and bonded thereto.

By inserting the diffraction grating between the first transparent substrate and the second transparent substrate, the combined thickness of the first member and the second member can be kept constant, and the diffraction grating can be protected.

Preferably, the diffractive element is a diffractive element in which at least one of the first resin and the second resin is an adhesive.

The first transparent substrate and the second transparent substrate can be bonded to each other with a strong adhesive strength.

Preferably, the diffractive element is a diffractive element in which further includes a first transparent substrate, and in where the diffraction grating is formed on the first transparent substrate, and either the first member or the second member is in non-contact with the first transparent substrate in at least a region constituting the diffraction grating.

When moisture in the air enters the inside of the diffractive element, an interfacial portion between the first member or the second member and the first transparent substrate is most easily penetrated by moisture, and thus the refractive index of the portion changes. However, an interfacial portion between either the first member or the second member and the first transparent substrate is uniformly continuous at least within a region constituting the diffraction grating, and even if the refractive index has changed due to moisture, there is little change in the difference in refractive index between the first member and the second member. Accordingly, stable diffraction characteristics can be obtained.

Preferably, the diffractive element is a diffractive element in which at least one of the first member and the second member has a water absorption coefficient of 2% or less.

Even if moisture in the air enters the diffractive element, there is a small change in the refractive indexes because the water absorptance coefficient is small. Accordingly, stable diffraction characteristics can be obtained.

Preferably, the diffractive element is a diffractive element in which the first member includes the first resin which dissolves, at a molecular level, the organic matter in which at least a portion of an optical absorption property in the predetermined wavelength range is lost, and does not have optical absorption in a predetermined wavelength range.

Similar to the case in which an organic matter is not dissolved in the first member, the diffractive element can have a high transmittance in both the two wavelengths of light.

Preferably, the diffractive element is a diffractive element in which the first resin and the second resin are the same, the organic matter before at least a portion of an optical absorption property of the first member is lost and the organic matter of the second member are the same, and the condensation of the organic matter included in the first member and the condensation of the organic matter included in the second member are equal to each other.

The first member and the second member includes the same organic matter dissolved in the equal concentration in the same resin. Therefore, the refractive index of the first member and the refractive index of the second member in a wavelength of light of the two wavelengths of light away from the predetermined wavelength range can be easily made coincide with each other.

According to another aspect of the invention, there is provided a diffractive element on which laser light for DVDs and laser light for CDs are incident from a laser light source and that transmits the laser light for DVDs and splits the laser light for CDs and emits the split laser light to an optical disc. The diffractive element includes a first member including a first resin and having a predetermined refractive index, and a second member having the same refractive index as the first member having the predetermined refractive index in the laser light for DVDs and having a refractive index different from the first member having the predetermined refractive index in the laser light for CDs. The first member and the second member are alternately arranged within an incidence plane of the two wavelengths of light, thereby constituting a diffraction grating. The second member includes a second resin to dissolve a dye having optical absorption in a predetermined wavelength range at a molecular level and is cured without using ultraviolet rays, whereby the refractive index of the second member is formed.

Therefore, the diffractive element has a high transmittance in laser light for DVDs and CDs, and can transmit the laser light for DVDs and diffract and split the laser light for CDs. Since the light for DVDs is not split into three beams, the loss can be suppressed. Therefore, the intensity of light which reaches an optical disc can be increased, and attainment of a high speed can be met. Also, since the laser light for CDs can be surely split into three beams, signals for stable tracking control can be obtained. Also, since the diffractive element is colored, it can be easily distinguished from other parts during manufacture. Moreover, since the second member is cured without using ultraviolet rays, the structure of the organic matter is not destructed, and thus the optical absorption in a predetermined wavelength range is maintained without any change.

According to still another aspect of the invention, there is provided a diffractive element on which two wavelengths of light are incident from a light source and that transmits the one wavelength of light and splits the other wavelength of light and emits the split light to an optical disc. The diffractive element includes a first member including a first resin and having a predetermined refractive index, and a second member having optical absorption in a predetermined wavelength range, and thereby having the same refractive index as the first member having the predetermined refractive index in the one wavelength of light and has a refractive index different from the first member having the predetermined refractive index in the other wavelength of light. The first member and the second member are alternately arranged within an incidence plane of the two wavelengths of light, thereby constituting a diffraction grating. The second member includes a second resin, and the second resin itself has optical absorption in the predetermined wavelength range.

Therefore, the diffractive element has a high transmittance in both two wavelengths of light, and can transmit one wavelength of light and diffract and split the other wavelength of light.

Preferably, the diffractive element is a diffractive element in which the second resin having conjugated double bond is aromatic polyimide.

The material having conjugated double bond sometimes can have optical absorption in a predetermined optical absorption.

Preferably, the diffractive element is a diffractive element in which the second resin having conjugated double bond is aromatic polyimide.

The diffraction characteristics of the diffractive element can be controlled at temperature at which polyimide is cured.

According to further still aspect of the invention, there is provided a method for manufacturing a diffractive element on which two wavelengths of light are incident from a light source and that transmits the one wavelength of light and splits the other wavelength of light and emits the split light to an optical disc. The method includes dissolving an organic matter having optical absorption in a predetermined wavelength range at a molecular level to mix the dissolved organic matter with a resin; coating the mixed resin on a first transparent substrate and curing the resin without using ultraviolet rays; irradiating the cured resin with ultraviolet rays through a mask pattern only a predetermined region of which transmits ultraviolet rays; and using a predetermined region in which has transmitted the ultraviolet rays as a first member in which the organic matter has lost at least a portion of its optical absorption property, and a region which has not transmitted the ultraviolet rays as a second member in which the organic matter maintains its optical absorption property, and generating a diffraction grating in which the second member has the same refractive index as the first member in the one wavelength of light and in which the second member has a refractive index different from the refractive index of the first member in the other wavelength of light.

A portion which has been shielded by a mask pattern and thereby has not been irradiated with ultraviolet rays functions as the second member because the organic matter having optical absorption in a predetermined wavelength range is kept without any change, and a portion which has been irradiated with ultraviolet rays functions as the first member because the structure of the organic matter is partially destructed and thereby at least a portion of an optical absorption property of the organic matter is substantially lost. Also, since it is not necessary to form irregularities by the first member or the second member, the surface of the first member or the second member can be easily made flat. Thus, the thickness of the first member and the second member is constant. Therefore, the second transparent substrate may not be provided.

According to still further aspect of the invention, there is provided an optical pickup device including a laser light source that emits laser light for DVDs and laser light for CDs and a diffractive element that transmits the laser light for DVDs and splits the laser light for CDs and emits the split laser light to an optical disc. The diffractive element includes a first member including a first resin and having a predetermined refractive index, and a second member having the same refractive index as the first member having the predetermined refractive index in the laser light for DVDs and having a refractive index different from the first member having the predetermined refractive index in the laser light for CDs. The first member and the second member are alternately arranged within an incidence plane of the two wavelengths of light, thereby constituting a diffraction grating. The second member includes a second resin to dissolve a dye having optical absorption in a predetermined wavelength range at a molecular level and is cured without using ultraviolet rays, whereby the refractive index of the second member is formed.

The diffractive element can have a high transmittance in both the laser light for DVDs and the laser light for CDs. Therefore, the output of laser light to be radiated onto an optical disc can be increased, and an optical pickup device to meet attainment of a high speed can be obtained. Moreover, since a diffractive element having a high transmittance can be mounted on an optical pickup device equipped with a laser light source which emits laser light for DVDs and laser light for CDs, attainment of a high speed of an optical pickup device equipped with a so-called dual-wavelength semiconductor laser can be met.

According to still further aspect of the invention, there is provided an optical disc apparatus includes a laser light source that emits laser light for DVDs and laser light for CDs and a diffractive element that transmits the laser light for DVDs and split the laser light for CDs and emit the split laser light to an optical disc. The diffractive element includes a first member including a first resin and having a predetermined refractive index, and a second member having the same refractive index as the first member having the predetermined refractive index in the laser light for DVDs and having a refractive index different from the first member having the predetermined refractive index in the laser light for CDs. The first member and the second member are alternately arranged within an incidence plane of the two wavelengths of light, thereby constituting a diffraction grating. The second member includes a second resin to dissolve a dye having optical absorption in a predetermined wavelength range at a molecular level and is cured without using ultraviolet rays, whereby the refractive index of the second member is formed.

The diffractive element can have a high transmittance in both the laser light for DVDs and the laser light for CDs, and the optical disc apparatus is equipped with an optical pickup device which can suppress the loss in the diffractive element is. Therefore, the output of laser light to be radiated onto an optical disc can be increased, and an optical disc apparatus to meet attainment of a high speed can be obtained.

Embodiment 1

Embodiment 1 of the invention will be described referring to the accompanying drawings.

First, the structure will be described. FIG. 1 shows the structure of a diffractive element of Embodiment 1 of the invention. FIG. 1A shows that a wavelength $\lambda 1$ of light transmits through the diffractive element, and FIG. 1B shows that a wavelength $\lambda 2$ of light transmits through the diffractive element. The diffractive element is configured such that a first member 2 and a second member 3 which constitutes a diffraction grating are sandwiched between a first transparent substrate 1 and a second transparent substrate 4. Two wavelengths of light from a light source enter the diffractive element of the invention. The diffractive element has a function of allowing one wavelength of light to be transmitted therethrough and the other wavelength of light to be separated and emitted to an optical disc. The diffraction grating causes a diffraction phenomenon by alternately and appropriately arranging the first member 2 and the second member 3 substantially parallel to each other in stripes within an incidence plane of two wavelengths of light. The two wavelengths of light are used as laser light having a wavelength $\lambda 1$ (approximately 650 nm) for DVDs and laser light having a wavelength $\lambda 2$ (approximately 780 nm) for CDs.

The first transparent substrate 1 is an optical glass, as represented by BK7, or an optical plastic. In the invention, the term "transparent" means that most of light in all predetermined wavelength ranges transmits through the diffractive element. The first transparent substrate 1 is usually polished so that both the front face and the rear face thereof becomes flat. Although the first transparent substrate 1 is in the shape of a cylinder or a rectangular parallelepiped, it may have other shapes, such as an elliptic cylinder, a quadrangular prism having rounded corners, a shape having rounder corners and a shape having chamfered corners, according to its design. The first member 2 and the second member 3 that perform diffraction are formed on the first transparent substrate.

The first member 2 transmits a wavelength $\lambda 1$ of light and a wavelength $\lambda 2$ of light, and has a first resin $2a$ that does not have optical absorption in a predetermined wavelength range. The first resin $2a$ is a transparent resin, for example, epoxy-based thermosetting adhesives, such as 310, 320 and 330 of Epo-Tek and acrylic ultraviolet curing adhesives, such as OG 114 of Epo-Tek, which are manufactured by Epoxy Technology Inc. in US, polyimide resins, such as PIMEL 7640, manufactured by Asahi Kasei Electronics Co., Ltd., and resists, such as AZ6130, manufactured by AZ Electronic Materials.

The second member 3 transmits a wavelength $\lambda 1$ of light and a wavelength $\lambda 2$ of light, and has an organic matter 5 which has optical absorption in a predetermined wavelength range and a second resin $3a$ that dissolves the organic matter 5. That is, the organic matter 5 is a solute, and the second resin $3a$ is a solvent.

The organic matter 5 has optical absorption in a predetermined wavelength range. When the organic matter 5 has optical absorption in the wavelength range of visible light, generally, it is classified broadly into a pigment and a dye. Although the dye of the them may be destructed in a portion of its structure by radiation of ultraviolet rays, the transmittance of the dye in the wavelength $\lambda 1$ and the wavelength $\lambda 2$ can be made higher than that of the pigment composed of particles because the dye is dissolved at a molecular level. When the wavelength $\lambda 1$ is approximately 650 nm used for DVDs, as the organic matter 5 which has optical absorption in a range having a shorter wavelength than the wavelength $\lambda 1$, there are, for example, Red No. 102, Red No. 2, etc. that are red dyes. Also, when the wavelength $\lambda 1$ is approximately 405 nm used for BDs (Blu-ray Discs) or HDDVDs (High Definition DVDs), the organic matter includes copper chlorophilline-sodium, or the like. Since the copper chlorophilline sodium is thin blue, and it rarely has optical absorption in the wavelength range of visible light and has most of optical absorption in the wavelength range of ultraviolet light, it can be narrowly considered to be the dye. Also, when the wavelength $\lambda 2$ is approximately 780 nm used for CDs, as the organic matter which has optical absorption in a range having a longer wavelength than the wavelength $\lambda 2$, there are NK-4432, NK-4489, NK-2911, etc. which have optical absorption in the wavelength range of ultrared light and are manufactured by Hayashibara Biochemical Laboratories, Inc. These examples cannot be considered to be dyes. Further, the organic matter 5 may be obtained by mixing a plurality of kinds of organic matters so as to have optical absorption in a predetermined wavelength range.

The second resin $3a$ is a transparent resin, for example, epoxy-based thermosetting adhesives, such as 310, 320 and 330 of Epo-Tek. These resins are heat-curable and are cured only by being heated without radiating ultraviolet rays. Since these resins are adhesives, they bonds the first transparent substrate 1 and the second transparent substrate together with a strong adhesive strength. Also, these resins may be polyimide resins, such as PIMEL 7640, or resists, such as AZ 6130, which are heat-cured. Also, these resins may be anaerobic resins which are cured only by being inserted between the first transparent substrate 1 and the second transparent substrate 4 without radiating ultraviolet rays.

The second transparent substrate 4 is an optical glass, as represented by BK7, or an optical plastic and protects the first member 2 and the second member 3. The second transparent substrate 4 is usually polished so that both the front face and the rear face thereof becomes flat.

Figure 2:
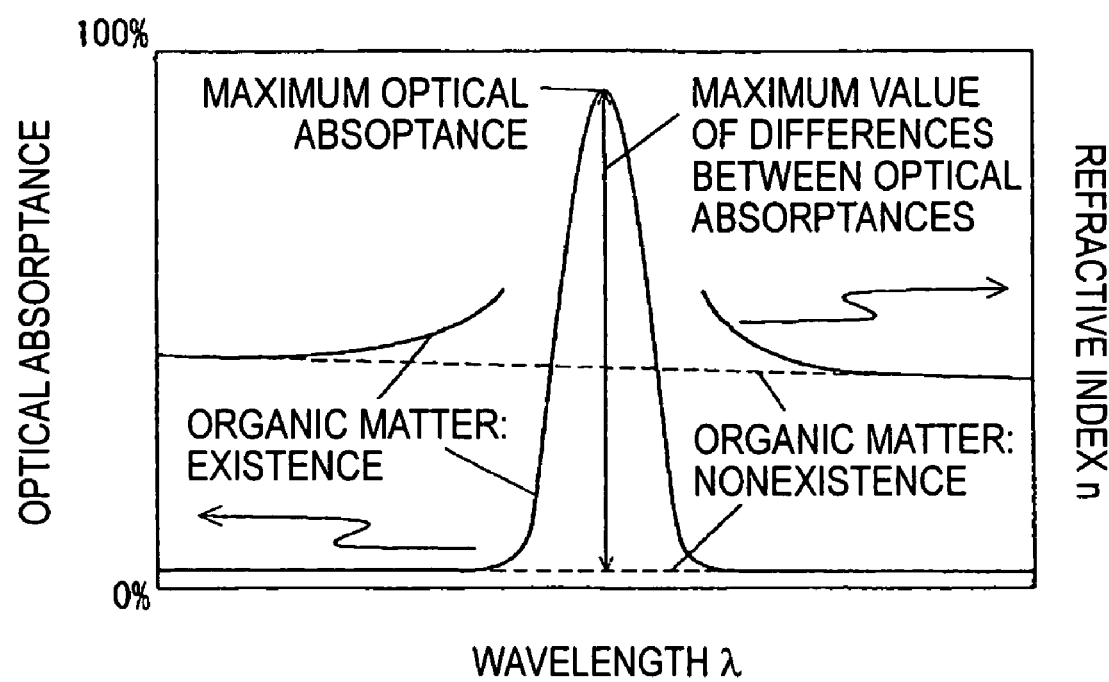
FIG. 2 is a graph showing the relation between wavelength and optical absorptance, and refractive index difference, depending on the existence and nonexistence of an organic matter having optical absorption in a predetermined wavelength range.
Figure 3:
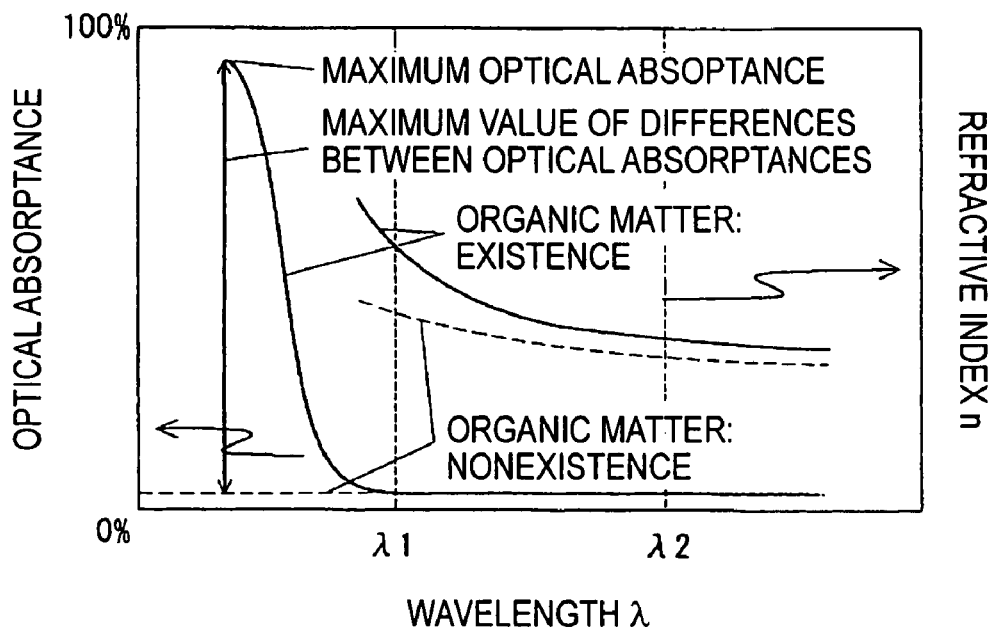
FIG. 3A is a graph showing the relation among wavelength, optical absorptance, and refractive index when being used as a diffractive element in a case where an organic matter has optical absorption in a range having a shorter wavelength than the wavelength $\lambda 1$.
FIG. 3B is a graph showing the relation among wavelength, optical absorptance, and refractive index when being used as a diffractive element in a case where an organic matter has optical absorption in a range having a longer wavelength than the wavelength $\lambda 2$.
Figure 3:
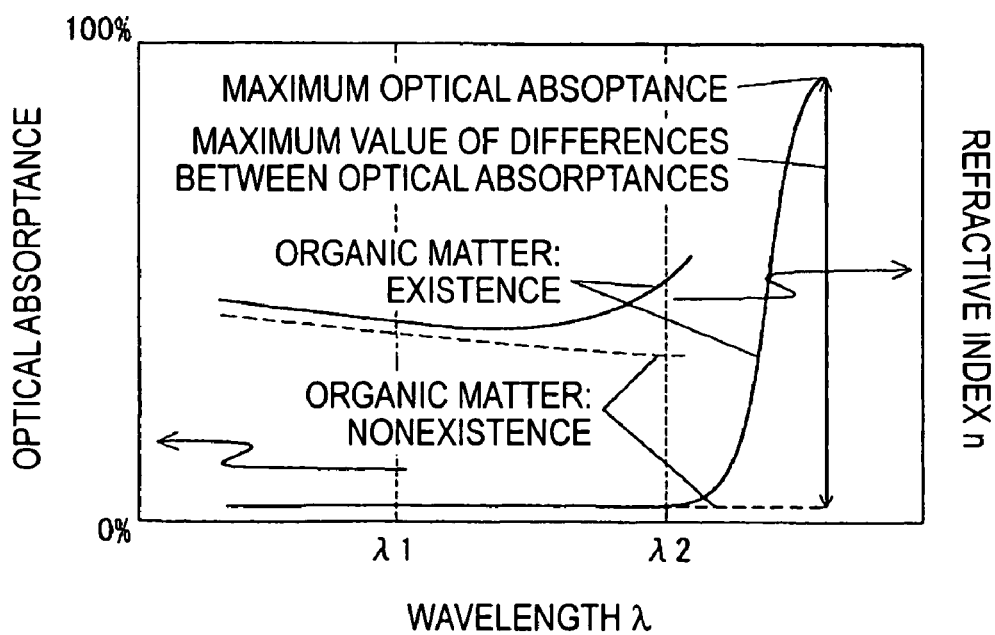

Next, the principle of the diffractive element will be described. FIG. 2 is a graph showing the relation between wavelength and optical absorptance, and refractive index difference, depending on the existence and nonexistence of an organic matter having optical absorption in a predetermined wavelength range. FIG. 3 is a graph showing the relation among wavelength, optical absorptance, and refractive index when a diffractive element is used, wherein FIG. 3A is a graph showing the relation among wavelength, optical absorptance, and refractive index when being used as a diffractive element in a case where an organic matter has optical absorption in a range having a shorter wavelength than the wavelength $\lambda 1$, and FIG. 3B is a graph showing the relation among wavelength, optical absorptance, and refractive index when being used as a diffractive element in a case where an organic matter has optical absorption in a range having a longer wavelength than the wavelength $\lambda 2$.

The organic matter 5 has optical absorption in a predetermined wavelength range. Even if the organic matter is dissolved in a resin as a solute, it holds a diluted optical absorption property. The highest optical absorptance in this wavelength range is referred to as "maximum optical absorptance". The optical absorption changes (excites) the electronic energy of the organic matter 5 which in turn exerts influence on the refractive index of the resin which has dissolved the organic matter 5. As a result, the refractive index of the resin in a wavelength range showing optical absorption and in a wavelength close to the wavelength range changes greatly (abnormal dispersion phenomenon). When being used as a diffractive element, it is necessary to select an organic matter 5, as shown in FIG. 3A, which has optical absorption in a range having a shorter wavelength than the wavelength $\lambda 1$, and an organic matter 5, as shown in FIG. 3B, which has optical absorption in a range having a longer wavelength than the wavelength $\lambda 2$. Also, the optical absorptance in the wavelength $\lambda 1$ and the wavelength $\lambda 2$ is selected as a value close to approximately 0% so that the quantity of the light emitted from a laser is lost as small as possible.

Figure 4:
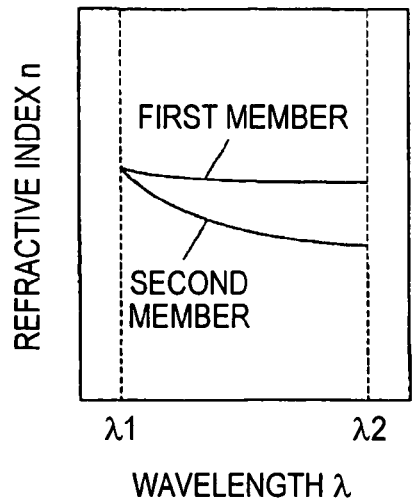
FIG. 4A is a graph showing patterns of refractive indexes of a first member and a second member in the wavelengths $\lambda 1$ and $\lambda 2$ when an organic matter that has optical absorption in a range having a shorter wavelength than the wavelength $\lambda 1$ is used, the refractive indexes of the members in the wavelength $\lambda 1$ are made equal to each other, and the refractive indexes of the members in the wavelength $\lambda 2$ are made different from each other.
FIG. 4B is a graph showing patterns of refractive indexes of the first member and the second member in the wavelengths $\lambda 1$ and $\lambda 2$ when an organic matter that has optical absorption in a range having a shorter wavelength than the wavelength $\lambda 1$ is used, the refractive indexes of the members in the wavelength $\lambda 1$ are made different from each other, and the refractive indexes of the members in the wavelength $\lambda 2$ are made equal to each other.
FIG. 4C is a graph showing patterns of refractive indexes of the first member and the second member in the wavelengths $\lambda 1$ and $\lambda 2$ when an organic matter that has optical absorption in a range having a longer wavelength than the wavelength $\lambda 2$ is used, the refractive indexes of the members in the wavelength $\lambda 1$ are made equal to each other, and the refractive indexes of the members in the wavelength $\lambda 2$ are made different from each other.
FIG. 4D is a graph showing patterns of refractive indexes of the first member and the second member in the wavelengths $\lambda 1$ and $\lambda 2$ when an organic matter that has optical absorption in a range having a longer wavelength than the wavelength $\lambda 2$ is used, the refractive indexes of the members in the wavelength $\lambda 1$ are made different from each other, and the refractive indexes of the members in the wavelength $\lambda 2$ are made equal to each other.
Figure 4:
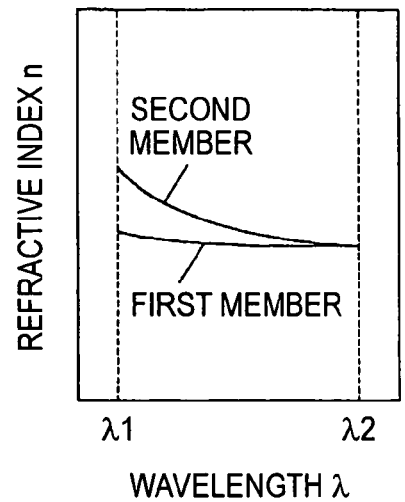
Figure 4:
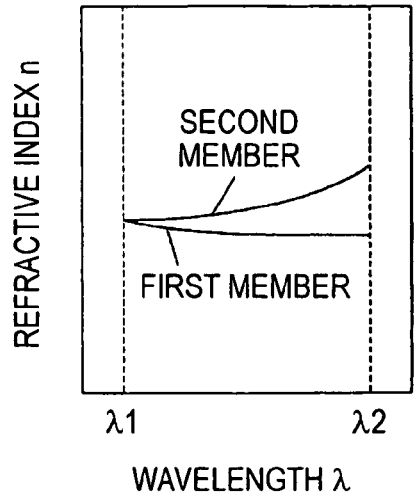
Figure 4:
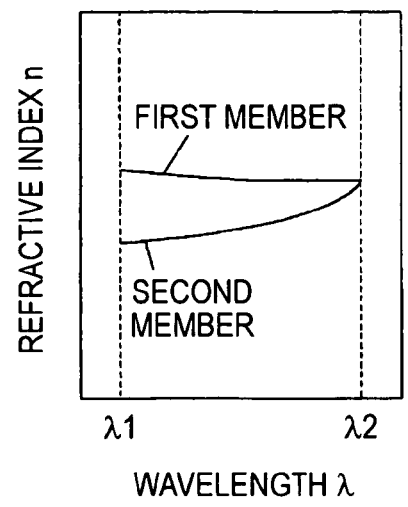

FIG. 4 is a graph showing patterns of refractive indexes of the first member 2 and the second member 3 in the wavelength $\lambda 1$ and the wavelength $\lambda 2$ wherein FIG. 4A is a graph showing patterns of refractive indexes of the first member and the second member in the wavelengths $\lambda 1$ and $\lambda 2$ when an organic matter that has optical absorption in a range having a shorter wavelength than the wavelength $\lambda 1$ is used, the refractive indexes of the members in the wavelength $\lambda 1$ are made equal to each other, and the refractive indexes of the members in the wavelength $\lambda 2$ are made different from each other; FIG. 4B is a graph showing patterns of refractive indexes of the first member and the second member in the wavelengths $\lambda 1$ and $\lambda 2$ when an organic matter that has optical absorption in a range having a shorter wavelength than the wavelength $\lambda 1$ is used, the refractive indexes of the members in the wavelength $\lambda 1$ are made different from each other, and the refractive indexes of the members in the wavelength $\lambda 2$ are made equal to each other; FIG. 4C is a graph showing patterns of refractive indexes of the first member and the second member in the wavelengths $\lambda 1$ and $\lambda 2$ when an organic matter that has optical absorption in a range having a longer wavelength than the wavelength $\lambda 2$ is used, the refractive indexes of the members in the wavelength $\lambda 1$ are made equal to each other, and the refractive indexes of the members in the wavelength $\lambda 2$ are made different from each other; FIG. 4D is a graph showing patterns of refractive indexes of the first member and the second member in the wavelengths $\lambda 1$ and $\lambda 2$ when an organic matter that has optical absorption in a range having a longer wavelength than the wavelength $\lambda 2$ is used, the refractive indexes of the members in the wavelength $\lambda 1$ are made different from each other, and the refractive indexes of the members in the wavelength $\lambda 2$ are made equal to each other. By appropriately selecting materials of the first resin 2a, the organic matter 5, and the second resin 3a that dissolves the organic matter 5 in this way, any refractive index difference between the first member 2 and the second member 3 in the wavelength $\lambda 1$ and the wavelength $\lambda 2$ can be appropriately controlled. For example, as shown in FIG. 4B, if the first resin 2a and the second resin 3a are made of the same resin material, a refractive index n1 ($\lambda 1$) of the first member 2 and a refractive index n2 ($\lambda 1$) of the second member 3 in the wavelength $\lambda 1$ can be made different from each other, and a refractive index n1 ($\lambda 2$) of the first member 2 and a refractive index n2 ($\lambda 2$) of the second member 3 in the wavelength $\lambda 2$ can be made almost equal to each other. Therefore, a wavelength $\lambda 1$ of light can be diffracted and a wavelength $\lambda 2$ of light can be transmitted. Also, when a curable resin is employed as the first rein 2a or the secon resin 3a, the curing rate of the resin can be adjusted and any difference in refractive index between respective materials can be more suitably controlled by appropriately setting the conditions under which the resin is cured. It should be noted herein that the diffraction efficiency in the wavelength $\lambda 1$ is determined depending on the depth of the diffraction grating and a difference between the refractive index n1 ($\lambda 1$) of the first member 2 and the refractive index n2 ($\lambda 1$) of the second member 3 in the wavelength $\lambda 1$. To the contrary, as shown in FIG. 4C, if the first resin 2a and the second resin 3a are made of the same resin material, and thereby the refractive index n1 ($\lambda 1$) of the first member 2 and the refractive index n2 ($\lambda 1$) of the second member 3 in the wavelength $\lambda 1$ can be equal to each other, a difference is caused between the refractive index n1 ($\lambda 2$) of the first member 2 and the refractive index n2 ($\lambda 2$) of the second member 3 in the wavelength $\lambda 2$. As a result, a wavelength $\lambda 1$ of light can be transmitted and a wavelength $\lambda 2$ of light can be diffracted. The diffractive element shown in FIG. 1 can be implemented by taking the pattern in FIG. 4A or FIG. 4C.

Also, it is preferable that the maximum optical absorptance of the second member 3 be close to 100% and the maximum optical absorptance of the first member 2 be close to 0%. Dissolving the organic matter 5 causes a change in refractive index. In this case, the magnitude of the change depends on the molar optical absorption coefficient of the organic matter 5 and the mixed quantity of the organic matter 5, and is reflected in the optical absorptance. If the maximum absorptance increases, the amount of change in the refractive index also increases as much. If the amount of change in the refractive index of the second member 3 is larger and the amount of change in the refractive index of the first member 2 is smaller, a refractive index difference within the diffraction grating in a wavelength that allows to function as the diffraction grating can be made larger. Therefore, the depth of the diffraction grating to obtain a predetermined spectral ratio (diffraction efficiency of first-order light/transmittance of zeroth-order light) is made smaller. Therefore, the number of man-hours in a process for forming the diffraction grating can be reduced. If the depth of the diffraction grating becomes deeper, even though the diffraction grating is etched or the diffraction grating is made irregular by a chemical treatment after the organic matter 5 is decomposed by radiation of ultraviolet rays through a mask pattern 11, the shape of the diffraction grating may deviate greatly from a rectangular shape which in turn may cause unevenness in characteristics. To the contrary, as the depth of the diffraction grating becomes shallower, the rectangular shape having an almost ideal pattern cross-section similar to design can be obtained. In order to obtain a rectangular shape having an almost ideal pattern section, the depth of the diffraction grating is required to be 8 μm or less. In setting the depth of the diffraction grating to 8 μm or less, the maximum value of differences between the optical absorptance of the second member 3 and the optical absorptance of the first member 2 may be set to 80% or more. By setting the maximum value of differences between the above optical absortances to 80% or more, the diffraction grating close to design can be obtained. Also, if the depth of the diffraction grating is set to 10 μm or less, it is possible to obtain a rectangular shape having a pattern section within a range in which there is no unevenness in characteristics. In setting the depth of the diffraction grating to 10 μm or less, the maximum value of differences between the above absorptances may be set to 60% or more. If the maximum value of differences between the above absorptances is set to 60% or more, stable characteristics can be obtained. Also, if the depth of the diffraction grating is set to 11 μm or less, it is possible to use a rectangular shape which has some unevenness in characteristics and also takes man-hours. In setting the depth of the diffraction grating to 11 μm or less, the maximum value of differences between the above absorptances should be set to 50% or more. If the maximum value of differences between the above optical absorptances is 50% or more, the diffractive element can exhibit its own function sufficiently and can be preferably used.

Figure 5:
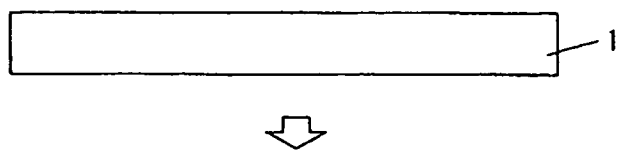
Figure 5:
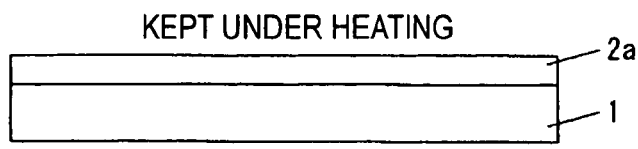
Figure 5:
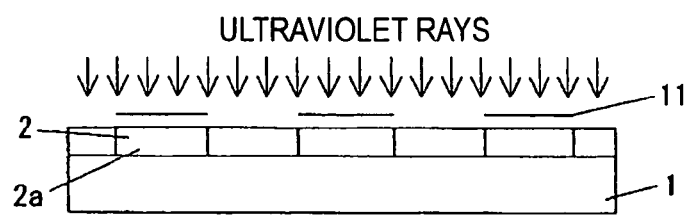
Figure 5:
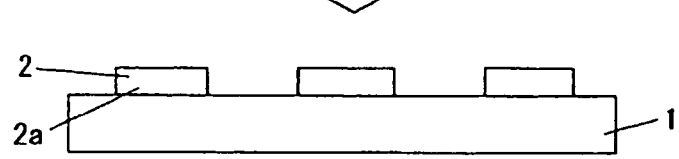
Figure 5:
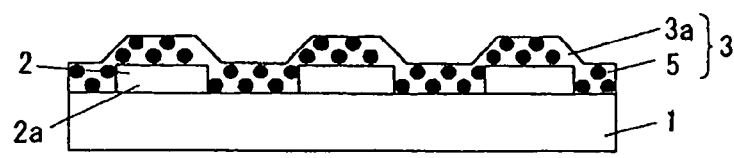
Figure 5:
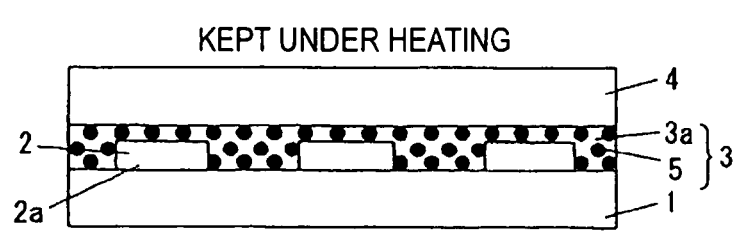

Next, the manufacture procedure will be described. FIG. 5 shows the procedure of fabricating a diffractive element of Embodiment 1. FIG. 5A shows a first transparent substrate, FIG. 5B shows that a first member has been coated and cured on the first transparent substrate, FIG. 5C shows that the coated first member is irradiated with ultraviolet rays through a mask pattern, FIG. 5D shows that irregular shapes have been made in the first member, FIG. 5E shows that a second member has been filled, and FIG. 5F shows that the second member has been cured by keeping a second transparent substrate under heating after the second transparent substrate is superimposed on the second member. It will be shown here that irregular shapes are physically formed to make a diffraction grating.

First, a first resin 2a, as shown in FIG. 5B, is coated on a first transparent substrate 1 as shown in FIG. 5A by a spin-coating method so as to have a predetermined uniform thickness, and is held and cured under heating. Next, as shown in FIG. 5C, the first resin is irradiated and developed with ultraviolet rays through a mask pattern 11 so as to show a predetermined pattern, thereby forming predetermined irregular shapes as shown in FIG. 5D. As a specific method of fabricating irregular patterns, there is, for example, a method in which a resist is coated on the first resin 2a, is then irradiated and developed with ultraviolet rays through the mask pattern 11 so as to show a predetermined pattern, and thereafter is dry-etched. Otherwise, a method may be performed in which a photosensitive material used as the first resin 2a is coated with a predetermined uniform thickness, and it is irradiated and developed with ultraviolet rays through the mask pattern 11 so as to show a predetermined pattern. A height difference between irregular shapes formed in the first resin 2a becomes the depth of a diffraction grating. It should be noted herein that final curing may be performed, if necessary. By appropriately setting each of curing conditions, the refractive index of the first resin 2a can be adjusted. Next, a second resin 3a having the dissolved organic matter 5, as shown in FIG. 5E, is filled in concavities of the irregular shapes by a spin-coating method, a screen printing method, or the like, and a second transparent substrate 4, as shown in FIG. 5F, is superimposed on the second resin. Finally, the whole diffractioin element is held under heating and cut into a predetermined size, resulting in a finished product.

Since the second resin 3a is a thermo-setting adhesive, it strongly bonds the first transparent substrate 1, the first member 2, the second member 3, and the second transparent substrate 4 together. Also, since ultraviolet rays are not radiated during manufacture of the diffractive element, the organic matter 5 does not lost its optical absorption function at all. Thus, there is no need to add the organic matter 5 in advance by its amount that may be lost by radiation of ultraviolet rays. Therefore, since the organic matter 5 exhibits its function as a diffractive element sufficiently in low concentration and the organic matter 5 is dissolved in the second resin 3a at a molecular level unlike a pigment whose particles are dispersed and suspended in a resin, the organic matter has no dispersion of light and has increased transmittance. Moreover, by appropriately setting curing conditions of the second resin 3a, the refractive index can be adjusted. For example, as shown in FIG. 1A, when a material is selected so that the refractive index n1 ($\lambda$1) of the first member 2 and the refractive index n2 ($\lambda$1) of the second member 3 in the wavelength $\lambda$1 becomes almost equal to each other, a difference is caused between the refractive index n1 ($\lambda$2) of the first member 2 and the refractive index n2 ($\lambda$2) of the second member 3 in the wavelength $\lambda$2, as shown in FIG. 1B. Accordingly, a wavelength $\lambda$1 of light is transmitted without any change because there is no difference between the refractive indexes within a diffraction grating, and a wavelength $\lambda$2 of light is diffracted because a difference between the refractive indexes is caused within a diffraction grating. As a result, it is possible to obtain a diffractive element having different characteristics depending on wavelengths.

Further, an organic matter 5 whose predetermined optical absorption is removed due to decomposition by previous radiation of ultraviolet rays may be dissolved in the first resin 2a. In this case, the patterns in FIG. 4B and FIG. 4C can be obtained by making the first resin 2a of the same material as the second resin 3a, and by setting an organic matter 5 to be dissolved in the first resin 2a and an organic matter 5 to be dissolved in the second resin 3a to the same concentration. It is noted herein that the light to be radiated is not limited to the ultraviolet rays and may include rays, such as vacuum ultraviolet rays, X-rays and $\gamma$-rays, having a shorter wavelength than the ultraviolet rays, as long as it partially destructs the structure of the organic matter 5 to deprive it of a predetermined optical absorption property.

Furthermore, it is preferable that either the first member 3 or the second member 3 has an absorptance of 2% or more. Even if the moisture in the air enters the diffractive element, there is a small change in the refractive indexes because the absorptance is small. Accordingly, stable diffraction characteristics can be obtained. Also, it is possible to prevent entering of moisture from the outside by surrounding the whole diffraction grating by a material having a small absorptance.

Embodiment 2

Figure 6:
Figure 6:
Figure 6:
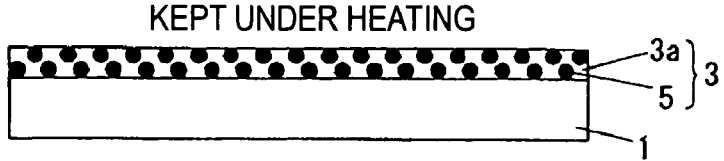
Figure 6:
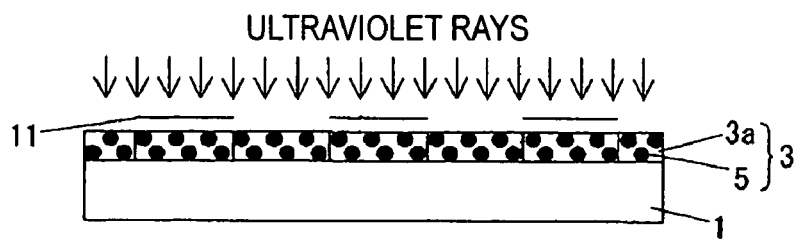
Figure 6:
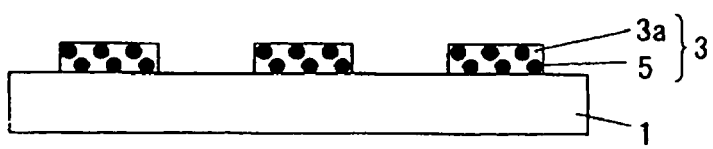
Figure 6:
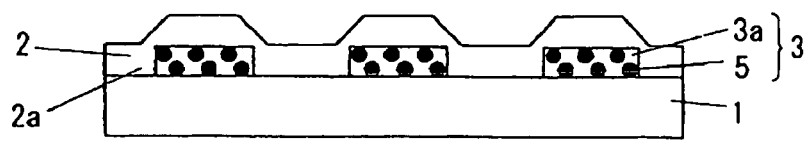

Embodiment 2 of the invention will be described referring to the accompanying drawings. FIG. 6 shows the procedure of fabricating a diffractive element of Embodiment 2. FIG. 6A shows a first transparent substrate, FIG. 6B shows that a second member has been coated and cured on the first transparent substrate, FIG. 6C shows that the coated second member is irradiated with ultraviolet rays through a mask pattern, FIG. 6D shows that irregular shapes have been made in the second member, FIG. 6E shows that a first member has been filled, and FIG. 6F shows that the first member has been cured by keeping a second transparent substrate under heating after the second transparent substrate is superimposed on the first member. In Embodiment 2, irregular shapes are physically formed in a second resin 3a having a dissolved organic matter 5 to make a diffraction grating.

In Embodiment 2, a first transparent substrate 1 and a second transparent substrate 4 are the same as those in Embodiment 1, and thus the description thereof will be incorporated herein. As the first resin 2a, there were used 310, 320, and 330 of Epo-Tek that are epoxy-based thermosetting adhesives which are manufactured by Epoxy Technology Inc. in US. The first resin may also be polyimide resins, such as PIMEL 7640, manufactured by Asahi Kasei Electronics Co., Ltd., and resists, such as AZ6130, manufactured by AZ Electronic Materials, which are heat-cured. As the second resin 3a, there were used 310, 320 and 330 of Epo-Tek. Also, these resins may be polyimide resins, such as PIMEL 7640, or resists, such as AZ 6130, which are heat-cured. When the wavelength $\lambda$1 is approximately 650 nm, as the organic matter 5, one of Red No. 102, Red No. 2, etc. which have optical absorption in a range having a shorter wavelength than the wavelength λ1 was dissolved in the second resin 3a. When the wavelength λ1 is approximately 405 nm, the organic matter may include copper chlorophilline sodium, or the like which has optical absorption in a range having a shorter wavelength than the wavelength λ1. When the wavelength λ2 is approximately 780 nm, the organic matter may include NK-4432, NK-4489, NK-2911, etc., manufactured by Hayashibara Biochemical Laboratories, which have optical absorption in a range having a longer wavelength than the wavelength λ2. In addition, the organic matter 5 may be obtained by mixing a plurality of kinds of organic matters so as to have optical absorption in a predetermined wavelength range.

First, a second resin 3a having a dissolved organic matter 5, as shown in FIG. 6B, is coated on a first transparent substrate 1 as shown in FIG. 6A by a spin-coating method so as to have a predetermined uniform thickness, and is held and cured under heating. Next, as shown in FIG. 6C, the second resin is irradiated and developed with ultraviolet rays through a mask pattern 11 so as to show a predetermined pattern, thereby forming predetermined irregular shapes in a second member 3. As a specific method of fabricating irregular patterns, there is, for example, a method in which a resist is coated on the second resin 3a, is then irradiated and developed with ultraviolet rays through the mask pattern 11 so as to show a predetermined pattern, and thereafter is dry-etched. Otherwise, a method may be performed in which a photosensitive material used as the second resin 3a is coated with a predetermined uniform thickness, and it is irradiated and developed with ultraviolet rays through the mask pattern 11 so as to show a predetermined pattern. In this case, a portion which is not irradiated with ultraviolet rays by the mask pattern 11 will be left as the second member 3. Next, a first resin 2a, as shown in FIG. 6D, is filled in concavities of the irregular shapes by a spin-coating method, a screen printing method, or the like, and a second transparent substrate 4, as shown in FIG. 6F, is superimposed on the first resin. Finally, the whole diffractive element is held under heating and cut into a predetermined size, resulting in a finished product.

In addition, the second resin 3a having the dissolved organic matter 5 was irradiated with ultraviolet rays through the mask pattern 11 so as to show a predetermined pattern. However, since a portion which is not irradiated with ultraviolet rays by the mask pattern 11 is left on the first transparent substrate 1 as the second member 3, the organic matter 5 included in the second member 3 does not receive any damages, such as a photoreaction caused by ultraviolet rays. Hence, the organic matter 5 gives a predetermined refractive index to the second member 3. Therefore, similar to that shown in FIG. 1A, when a material is selected so that the refractive index n1 (λ1) of the first member 2 and the refractive index n2 (λ1) of the second member 3 in the wavelength λ1 becomes equal to each other, a difference can be caused between the refractive index n1 (λ2) of the first member 2 and the refractive index n2 (λ2) of the second member 3 in the wavelength λ2, similar to that shown in FIG. 1B. Accordingly, a wavelength λ1 of light is transmitted without any change because there is no difference between the refractive indexes within a diffraction grating, and a wavelength λ2 of light is diffracted because a difference between the refractive indexes is caused within a diffraction grating. As a result, it is possible to obtain a diffractive element having different characteristics depending on wavelengths.

Similar to Embodiment 1, an organic matter 5 whose predetermined optical absorption is removed due to decomposition by previous radiation of ultraviolet rays may be dissolved in the first resin 2a. In this case, the patterns in FIG. 4B and FIG. 4C can be obtained by making the first resin 2a of the same material as the second resin 3a, and by setting an organic matter 5 to be dissolved in the first resin 2a and an organic matter 5 to be dissolved in the second resin 3a to the same concentration. Similar to Embodiment 1, it is noted herein that the light to be radiated is not limited to the ultraviolet rays and may include rays, such as vacuum ultraviolet rays, X-rays and γ-rays, having a shorter wavelength than the ultraviolet rays, as long as it partially destructs the structure of the organic matter 5 to deprive it of a predetermined optical absorption property.

Embodiment 3

Figure 7:
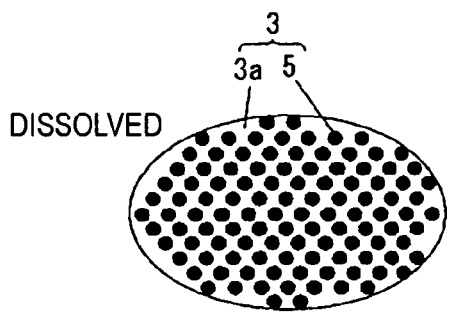
Figure 7:
Figure 7:
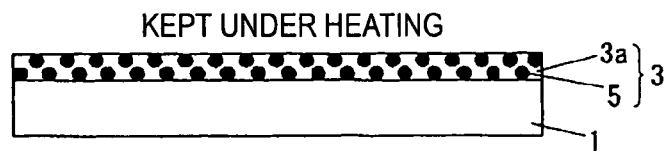
Figure 7:
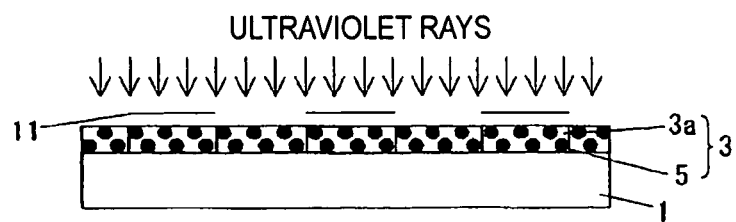
Figure 7:
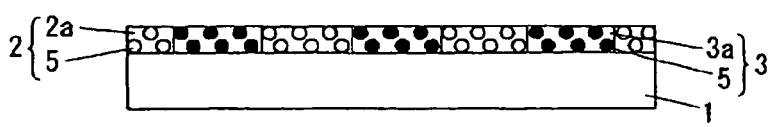

Embodiment 3 of the invention will be described referring to the accompanying drawings. FIG. 7 shows the procedure of fabricating a diffractive element of Embodiment 3. FIG. 7A shows a second resin having a dissolved organic matter, FIG. 7B shows a first transparent substrate, FIG. 7C shows that a second member has been coated and cured on the first transparent substrate, FIG. 7D shows that the coated second member is irradiated with ultraviolet rays through a mask pattern, and FIG. 7E shows that a diffraction grating has been formed by radiation/non-radiation of ultraviolet rays. In Embodiment 3, a diffraction grating is formed without forming physical irregular shapes, unlike in Embodiment 1 and Embodiment 2.

In Embodiment 3, a first transparent substrate 1 is the same as that in Embodiment 1, and thus the description thereof will be incorporated herein. As the second resin 3a, there were used, epoxy-based thermosetting adhesives, such as 310, 320 and 330 of Epo-Tek and acrylic ultraviolet curing adhesives, such as OG 114 of Epo-Tek, which are manufactured by Epoxy Technology Inc. in US, polyimide resins, such as PIMEL 7640, manufactured by Asahi Kasei Electronics Co., Ltd., and resists, such as AZ6130, manufactured by AZ Electronic Materials. When the wavelength λ1 is approximately 650 nm, as the organic matter 5, one of Red No. 102, Red No. 2, etc. which have optical absorption in a range having a shorter wavelength than the wavelength λ1 was dissolved in the second resin 3a. When the wavelength λ1 is approximately 405 nm, the organic matter may include copper chlorophilline sodium, or the like which has optical absorption in a range having a shorter wavelength than the wavelength λ1. When the wavelength λ2 is approximately 780 nm, the organic matter may include NK-4432, NK-4489, NK-2911, etc., manufactured by Hayashibara Biochemical Laboratories, which have optical absorption in a range having a longer wavelength than the wavelength λ2. In addition, the organic matter 5 may be obtained by mixing a plurality of kinds of organic matters so as to have optical absorption in a predetermined wavelength range.

First, as shown in FIG. 7A, an organic matter 5 is dissolved in a second resin 3a. Next, a second resin 3a having a dissolved organic matter 5, as shown in FIG. 7C, is coated on a first transparent substrate 1 as shown in FIG. 7B by a spin-coating method so as to have a uniform resin thickness. Next, the second resin is held and cured under heating. Finally, as shown in FIG. 7D, the second resin is irradiated and developed with ultraviolet rays through a mask pattern 11 so as to show a predetermined pattern, and is then cut into a predetermined size. In this case, as shown in FIG. 7E, a portion of the organic matter 5 which is not irradiated with ultraviolet rays by the mask pattern 11 does not receive any damages, such as a photoreaction caused by ultraviolet rays. Accordingly, the above portion exhibits a predetermined function as a second member 3. On the other hand, since the other portion of the organic matter 5 which was irradiated with ultraviolet rays is decomposed by a photoreaction, etc. caused by ultraviolet rays, it does not have optical absorption enough to cause a change in refractive index in the wavelength λ1 and the wavelength λ2. Hence, the portion which was irradiated with ultraviolet rays functions as a first member 2 which has not optical absorption. As a result, when the organic matter 5 has optical absorption in a range having a shorter wavelength than the wavelength λ1, the refractive index n1 (λ2) of the first member 2 and the refractive index n2 (λ2) of the second member 3 becomes almost equal to each other in the wavelength λ2, and a difference is caused between the refractive index n1 (λ1) of the first member 2 and the refractive index n2 (λ1) of the second member 3 in the wavelength λ1. Accordingly, a wavelength λ1 of light is diffracted because a difference between the refractive indexes is caused within a diffraction grating, and a wavelength λ2 of light is transmitted without any change because there is no difference between the refractive indexes within a diffraction grating. As a result, it is possible to obtain a diffractive element having wavelength selectivity of different characteristics depending on wavelengths. Also, when the organic matter has optical absorption in a range having a longer wavelength than the wavelength λ2, a wavelength λ1 of light is transmitted without any change because there is no difference between the refractive indexes within a diffraction grating, and a wavelength λ2 of light is diffracted because a difference between the refractive indexes is caused within a diffraction grating. As a result, it is possible to obtain a diffractive element having wavelength selectivity of different characteristics depending on wavelengths. In addition, it is noted herein that the light to be radiated is not limited to the ultraviolet rays and may include rays, such as vacuum ultraviolet rays, X-rays and γ-rays, having a shorter wavelength than the ultraviolet rays, as long as it partially destructs the structure of the organic matter 5 to deprive it of a predetermined optical absorption property. Also, the diffractive element can exhibit its function sufficiently by radiating the above light such that the maximum value of differences between the optical absorptance of the second member 3 and the optical absorptance of the first member 2 is 80% or more.

In addition, in Embodiment 3, the second transparent substrate 4 is not provided. This is based on the following reasons. In Embodiment 1 and Embodiment 2, irregular shapes of the first member 2 or the second member 3 are made by development with radiation of ultraviolet rays, and the second resin 3a or the first resin 2a is coated so as to fill concavities of the irregular shapes. A spin-coating method is employed as this coating method. However, in the spin-coating method, the surfaces of the members after coating could only be coated in the shape in which irregular shapes are reflected and it is difficult to make the surfaces after coating completely flat. If the surfaces are made completely flat, the light which has transmitted through the diffractive element may cause an interference due to an optical path length difference caused by irregularities thereof. Therefore, the surface of the second member 3 or the first member 2 after coating is made flat by superimposing the second transparent substrate 4 having flat surfaces to be bonded, on the member. A function to protect the first member 2 and the second member 3 is also given to the second transparent substrate 4 by providing the second transparent substrate 4. In addition, in Embodiment 3, since there is no step of filling a resin in concavities of irregular shapes by the spin-coating method, it is not necessary to provide, particularly, the second transparent substrate 4.

Here, when prevention of a damage to the diffraction grating during assembly, an improvement in reliability, and the like are taken into consideration, the second transparent substrate 4 may be a protective film obtained by uniformly coating an adhesive, such as epoxy resin, using the spin-coating method, and then heat-curing the adhesive. Of course, as in Embodiment 1 and Embodiment 2, the second transparent substrate 4 may be bonded by an adhesive. In this case, it is preferable that the second transparent substrate 4 be bonded after radiation of ultraviolet rays. After an adhesive is coated on a surface of a diffractive element which has been once completed by radiation of ultraviolet rays, the second transparent substrate 4 is superimposed on the surface, and the whole diffractive element is then held under heating, resulting in a finished product. In a case where the second transparent substrate 4 is superimposed after coating the second resin 3a, if ultraviolet rays are radiated through the mask pattern 11, pattern precision may deteriorate by a thickness of the second transparent substrate 4, and a boundary between a portion that is irradiated with ultraviolet rays and a portion which is not radiated with ultraviolet rays may become vague. In this case, since the second resin 3a may be a thermosetting adhesive, it is unnecessary to coat an additional adhesive again, and it is thus possible to simplify the process.

Embodiment 4

Figure 8:
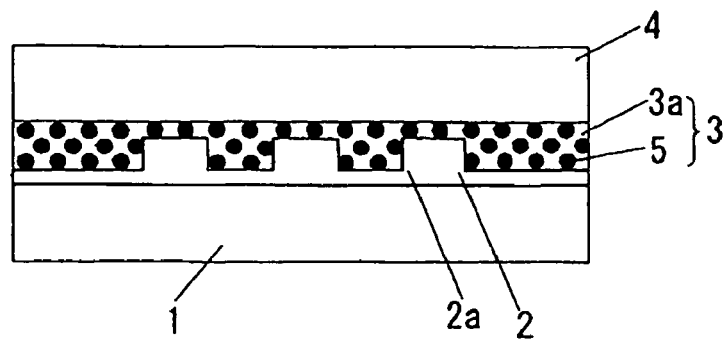
FIG. 8A is a schematic diagram showing that the first member in concavities of Embodiment 4 is left thin without being completely removed.
FIG. 8B is a schematic diagram showing that the second member in concavities is left thin without being completely removed.
FIG. 8C is a schematic diagram showing that the first member in concavities in a region constituting the diffraction grating is left thin without being completely removed.
FIG. 8D is a schematic diagram showing that the second member in concavities in a region constituting the diffraction grating is left thin without being completely removed.
Figure 8:
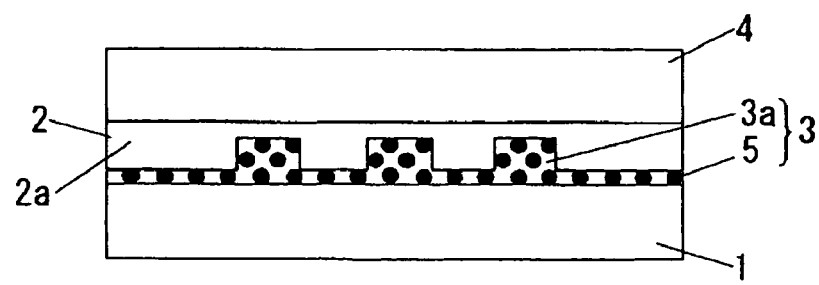
Figure 8:
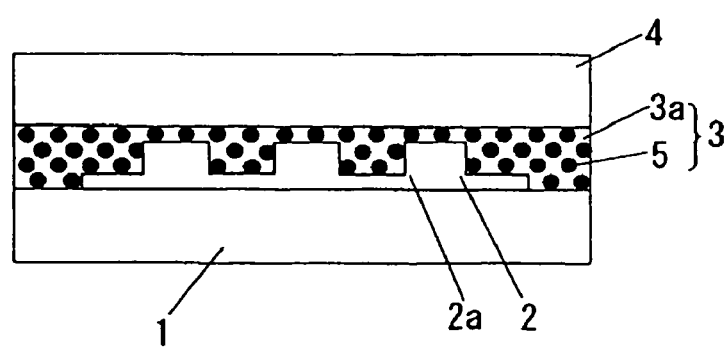
Figure 8:
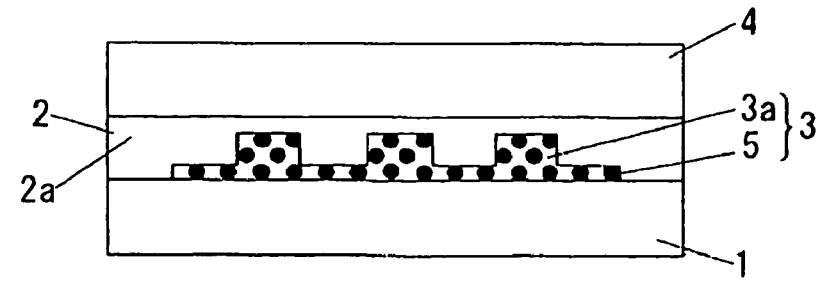

Embodiment 4 of the invention will be described referring to the accompanying drawings. Embodiment 4 is a diffractive element in which either a first member or a second member is in non-contact with a first transparent substrate at least in a region which constitutes the diffraction grating. FIG. 8A is a schematic diagram showing that the first member in concavities of Embodiment 4 is left thin without being completely removed, FIG. 8B is a schematic diagram showing that the second member in concavities is left thin without being completely removed, FIG. 8C is a schematic diagram showing that the first member in concavities in a region constituting the diffraction grating is left thin without being completely removed, and FIG. 8D is a schematic diagram showing that the second member in concavities in a region constituting the diffraction grating is left thin without being completely removed. In both the first member 2 in Embodiment 1 and the second member 3 in Embodiment 2, which form irregular shapes, FIGS. 1, 5 and 6 show that the first transparent substrate 1 is exposed to concavities, and it touches the second member 3 or the first member 2, respectively. However, the first member 2 or the second member 3 may be left without exposing the first transparent substrate 1 to the concavities.

A first transparent substrate 1, a first resin 2a, a second resin 3a, an organic matter 5, and a second transparent substrate 4 are the same as those in Embodiment 1, and thus the description will be incorporated herein. In a case of FIG. 8A, first, a first resin 2a is coated on a first transparent substrate 1 by the spin-coating method so as to have a predetermined uniform thickness, and is held and cured under heating, thereby forming a second member 2. Next, predetermined irregular patterns are formed in the first member 2. As a method of fabricating irregular patterns, there is, for example, a method in which a resist is coated on the first member 2, is then irradiated and developed with ultraviolet rays through a mask pattern 11 so as to show a predetermined pattern, and is dry-etched. In this method, when the first member 2 has been etched to a predetermined depth, the dry etching is finished so that the concavities of the first member 2 are not completed removed. Also, a method may be performed in which a photosensitive material used as a first resin 2a is coated with a predetermined uniform thickness, and it is irradiated and developed with ultraviolet rays through the mask pattern 11 so as to show a predetermined pattern. In this method, the quantity of radiation of ultraviolet rays and development conditions are controlled so that the first member 2 is removed only to a predetermined depth. A difference in height between convexities and concavities of the irregular shapes of the first member 2 becomes the depth of the diffraction grating. Next, a second resin 3a having an organic matter 5 dissolved in advance is coated by the spin-coating method or the screen printing method so as to be filled between irregular shapes formed in the first member 2. Then, a second transparent substrate 4 is superimposed on the second resin, and the resulting whole is held under heating. The cured second resin 3a serves as a second member 3. Only the first member 2 touches the first transparent substrate 1 and the second member 3 is in non-contact with the first transparent substrate. Finally, the whole is cut into a predetermined size, resulting in a finished product.

Also, in a case of FIG. 8B, the first member 2 and the second member 3 are made by reversing the case of FIG. 8A. In this case, if the first member and the second member are fabricated by a fabricating method similar to the case of FIG. 8A, concavities of the second member 3 are irradiated with ultraviolet rays, whereby the structure of an organic matter 5 may be destructed partially and may lose optical absorption in a predetermined wavelength range. However, its influence is little because the thickness of the concavities is small in actuality.

A case in which irregular shapes are formed in the first member 2 and moisture enters a diffraction grating portion from the outside will be considered. Also, a surface portion of the first member 2 easily changes in refractive index when there is any penetration of moisture. Generally, an interface between an inorganic matter, such as the first transparent substrate 1, and an organic matter, such as the first member 2 or the second member 3, has a weaker adhesion force than an interface between organic matters, such as the first member 2 and the second member 3, and the interface is easily subject to penetration of moisture. In a structure in which the first member 2 in the concavities of the irregular shapes is all removed, since the interface of the first member 2 and the first transparent substrate 1 is easily subject to penetration of moisture, only the refractive index of the first member 2 changes in an interfacial portion with the first transparent substrate 1. As a result, since the refractive index of the first member 2 changes as a whole, and the refractive index of the second member 3 does not change, the spectral ratio may change. Accordingly, it is preferable that either the first member 2 or the second member 3 be set to an absorptance of 2% or less so that a change in refractive index is small, even if the moisture in the air penetrates the inside of the diffractive element.

On the other hand, in a structure in which the first member 2 is left in the concavities of the irregular shapes, similarly, moisture penetrates from an interface between the first member 2 and the first transparent substrate 1 and the refractive index of the first member 2 in an interfacial portion with the first transparent substrate 1 changes. However, the change in the refractive index of the first member 2 occurs equally in both the convexities and concavities of the irregular shapes. Therefore, the change in the refractive index of the convexities and the change in the refractive index of the concavities occurs equally. Accordingly, even if there is any penetration of moisture, the difference in refractive index between the convexities and the concavities is small, and the change in the spectral ratio is also small.

Also, one of the factors that causes penetration of moisture is interfacial peeling. In order to suppress the interfacial peeling, it is effective to increase the surface of an interface. The area of contact between the first member 2 and the first transparent substrate 1 in the structure in which the first member 2 is left in the concavities of the irregular shapes is larger than the area of contact between the first member 2 and the first transparent substrate 1 or the second member 3 and the first transparent substrate 1 in the structure in which the first member 2 in the concavities is all removed. Accordingly, this is attributed to the effect that the interfacial peeling hardly occurs Specifically, when the moisture in the air enters the inside of the diffractive element, an interfacial portion between the first member 2 or the second member 3 and the first transparent substrate 1 is most easily penetrated by moisture, and thus the refractive index of the portion changes. However, the interfacial portion between either the first member 2 or the second member 3 and the first transparent substrate 1 is uniformly continuous at least within a region constituting the diffraction grating, and even if the refractive index has changed due to moisture, there is little change in the difference in refractive index between the first member 2 and the second member 3. As such, since the diffractive element of Embodiment 4 not only acts as a diffractive element having a high transmittance in the wavelength λ1 and the wavelength λ2, but also resists against the penetration of moisture, it has a small fluctuation in spectral ratio. Accordingly, stable diffraction characteristics can be obtained.

In addition, as shown in FIG. 8C, the first member 2 in concavities of a region constituting a diffraction grating may be left thin without being completely removed, and the periphery of the first member may be surrounded by the second member 3. In this case, it is preferable that the second member 3 surrounding the periphery be made of a material having a low water absorption coefficient of 2% or less or a material having a good adhesiveness with the first transparent substrate 1. In addition, conversely, as shown in FIG. 8D, the second member 3 in concavities of a region constituting a diffraction grating may be left thin without being completely removed, and the periphery of the second member may be surrounded by the first member 2. In this case, it is preferable that the first member 2 surrounding the periphery be made of a material having a low water absorption coefficient of 2% or less or a material having a good adhesiveness with the first transparent substrate 1.

Embodiment 5

Figure 9:
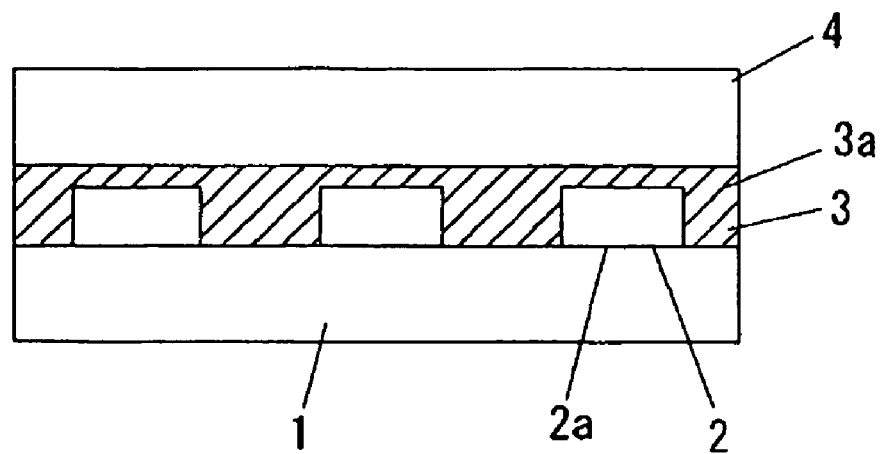
FIG. 9A shows the structure of one exemplary diffractive element of Embodiment 5.
FIG. 9B shows the structure of another exemplary diffractive element.
Figure 9:
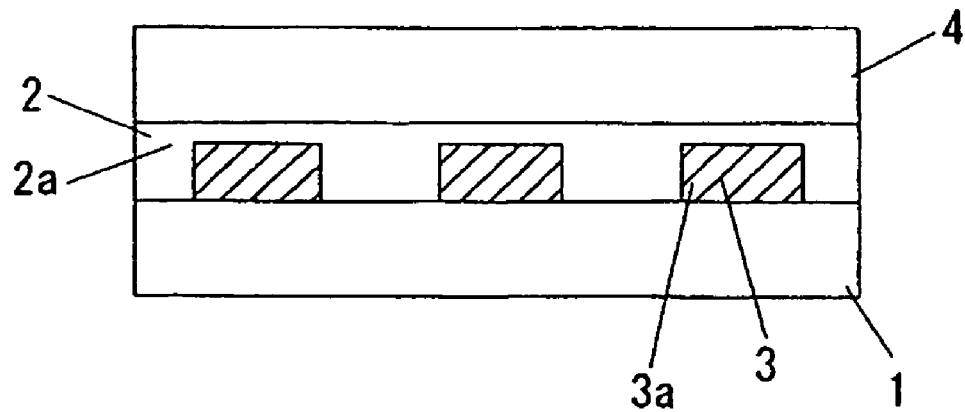

Embodiment 5 of the invention will be described referring to the accompanying drawings. Embodiment 5 is a diffractive element that a second resin 3a itself has optical absorption in a predetermined wavelength range. FIG. 9A shows the structure of one exemplary diffractive element of Embodiment 5, and FIG. 9B shows the structure of another exemplary diffractive element.

A first transparent substrate 1 and a second transparent substrate 4 are the same as those in Embodiment 1, and thus the description thereof will be incorporated herein. A first resin 2a is also the same as that in Embodiment 1, and thus the description thereof will be incorporated herein.

The second resin 3a transmits the wavelength λ1 of light and the wavelength λ2 of light and has optical absorption in a predetermined wavelength range. The height of convexities formed by a second member 3 having the second resin 3a becomes the depth of a diffraction grating. It is preferable that the material for the second resin 3a be a material having conjugated double bond. As the material having conjugated double bond, there are aromatic polyimide, polyacene including pentacene, etc. As the aromatic polyimide, there are PIMEL 7621 available from the Asahi Kasei Electronics Co., Ltd., PW 1200 available from Toray Co., Ltd, etc. The material having conjugated double bond sometimes has an optical absorption property. Generally, as a conjugate system gets larger, the peak of optical absorption of the system deviates toward a longer wavelength, and thus the magnitude of the optical absorption peak also tends to get larger.

Since the second member 3 including the second resin 3$a$ having optical absorption in a predetermined wavelength range causes an abnormal dispersion phenomenon, a large difference is caused between the refractive indexes in the wavelength $\lambda 1$ and the wavelength $\lambda 2$. On the other hand, the first member 2 including the first resin 2$a$ which does not have optical absorption in a predetermined wavelength range has a small difference between the refractive indexes in the wavelength $\lambda 1$ and the wavelength $\lambda 2$. Accordingly, a diffractive element can be configured by selecting a material well to make a difference in refractive index between the first member 2 and the second member 3 in the wavelength $\lambda 1$ approximately zero and make the refractive indexes of the first member 2 and the second member 3 in the wavelength $\lambda 2$ different from each other. As for the first member 2 and the second member 3, the first member 2, as shown in FIG. 9A, may be a member which forms irregular shapes, or the second member 3 may be a member which fills its irregularities, and vice-versa, as shown in FIG. 9B.

Figure 10:
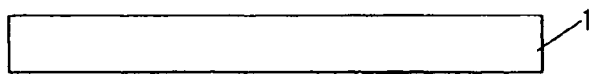
Figure 10:
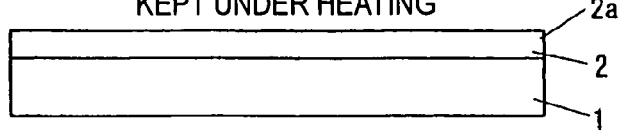
Figure 10:
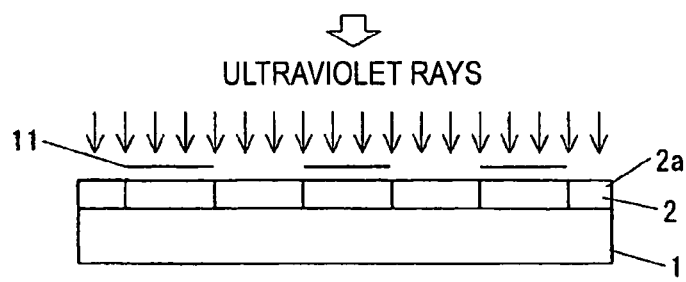
Figure 10:
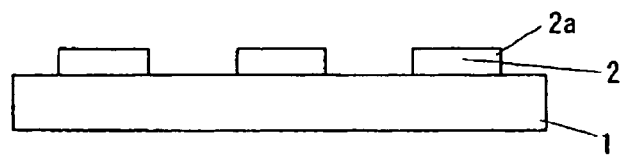
Figure 10:
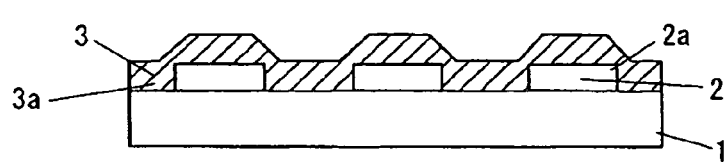
Figure 10:
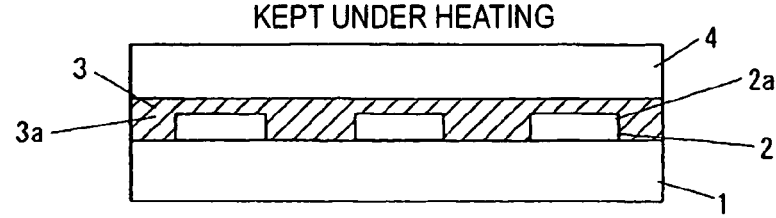

Next, the manufacture procedure will be described. FIG. 10 shows the procedure of fabricating a diffractive element of Embodiment 5. FIG. 10A shows a first transparent substrate, FIG. 10B shows that a first member has been coated and cured on the first transparent substrate, FIG. 10C shows that the coated first member is irradiated with ultraviolet rays through a mask pattern, FIG. 10D shows that irregular shapes has been made in the first member, FIG. 10E shows that a second member has been filled, and FIG. 10F shows that the second member has been cured by keeping a second transparent substrate under heating after the second transparent substrate is superimposed on the second member.

As the second resin, 3$a$, aromatic polyimide is used. First, a first resin 2$a$ is coated on a first transparent substrate 1 as shown in FIG. 10A by the spin-coating method so as to have a predetermined uniform thickness, as shown in FIG. 10B. Next, the first resin is held and cured under heating, thereby forming a first member 2. Next, as shown in FIG. 10D, predetermined convex patterns are formed in the first member 2. As a method of fabricating convex patterns, as shown in FIG. 10C, there is, for example, a method in which a resist is coated on the first member 2, is then irradiated and developed with ultraviolet rays through a mask pattern so as to show a predetermined pattern, and is dry-etched. There is also a method in which the first resin is irradiated and developed with ultraviolet rays through the mask pattern 11 so as to show a predetermined pattern. The height of the convex shapes formed in the first member 2 becomes the depth of a diffraction grating. As the predetermined pattern, there is, for example, a pattern in which the first member 2 and the second member 3 are alternately arranged substantially parallel to each other in stripes within an incidence plane of light. Diffraction characteristics are determined by the pitch and depth of the convex shapes. Next, as shown in FIG. 10E, a second resin 3$a$ is coated by the spin-coating method or the screen printing method so as to be filled between convex shapes formed in the first member 2. Then, as shown in FIG. 10F, a second transparent substrate 4 is superimposed on the second resin, and the resulting whole is held under heating. The cured second resin 3$a$ serves as a second member 3. Finally, the whole is cut into a predetermined size, resulting in a finished product.

Since the second resin 2$a$ itself has optical absorption in a predetermined wavelength range, it is not necessary to newly dissolve the organic matter 5, unlike in Embodiment 1 been described. Thus, the manufacture can be facilitated. Also, a structure including the organic matter 5 as described in Embodiment 1 has not been described in Embodiment 5. However, the first member 2 may be formed by dissolving the organic matter 5 in the first resin 2$a$, or the second member 3 may be formed by dissolving the organic matter in the second resin 3$a$. By doing so, since the controllable range of the refractive index is widened, the degree of freedom in design of the diffractive element is widened.

In addition, although the fabricating method has been described in conjunction with the structure shown in FIG. 9A, this is almost the same as in the structure of FIG. 9B. In other words, the first member 2 and the second member 3 may be replaced with each other. The property of optical absorption resulting from partial destruction of the structure caused by radiation of ultraviolet rays is hardly lost even in any configuration. Also, since there is no optical absorption property in a configuration in which particles are suspended like pigments, the transmittance in the wavelength $\lambda 1$ and the wavelength $\lambda 2$ can be made higher than that in the pigments.

Embodiment 6

Figure 11:
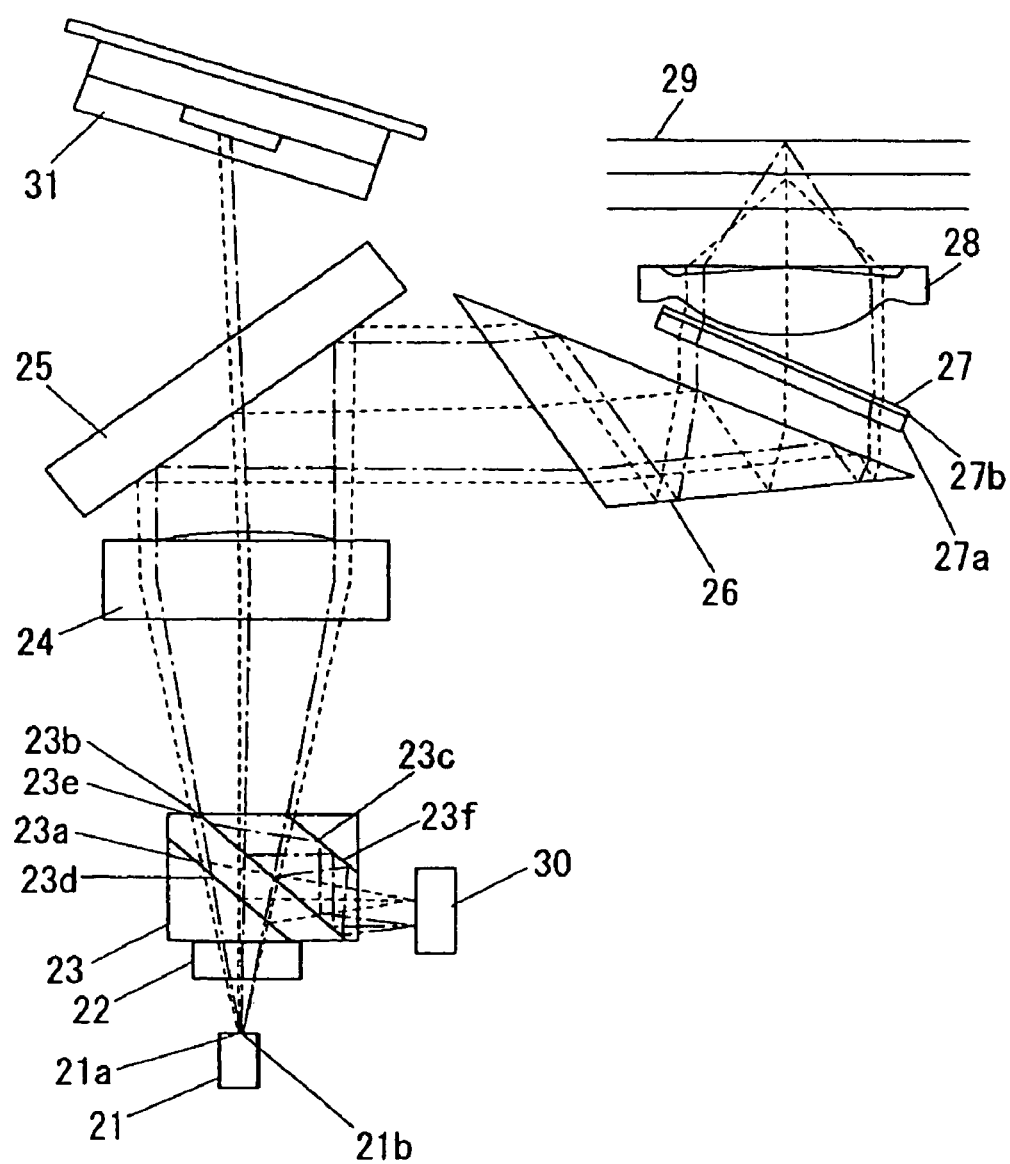
FIG. 11 schematically shows the structure of a whole optical system of an optical pickup device of Embodiment 6.

Embodiment 6 of the invention will be described referring to the accompanying drawings. Embodiment 6 is an optical pickup device which uses the diffractive elements described in Embodiment 1 to Embodiment 5. FIG. 11 schematically shows the structure of a whole optical system of an optical pickup device of Embodiment 6, FIG. 12A is a top plan view of the optical pickup device of Embodiment 6, and FIG. 12B is a bottom plan view of the optical pickup device.

Figure 12:
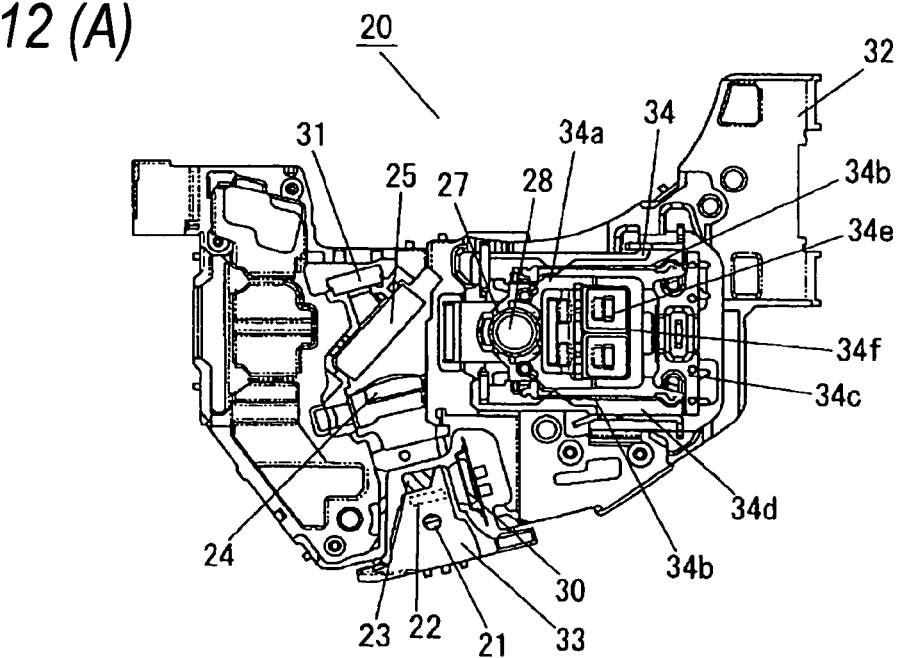
FIG. 12A is a top plan view of the optical pickup device of Embodiment 6.
FIG. 12B is a bottom plan view of the optical pickup device.
Figure 12:
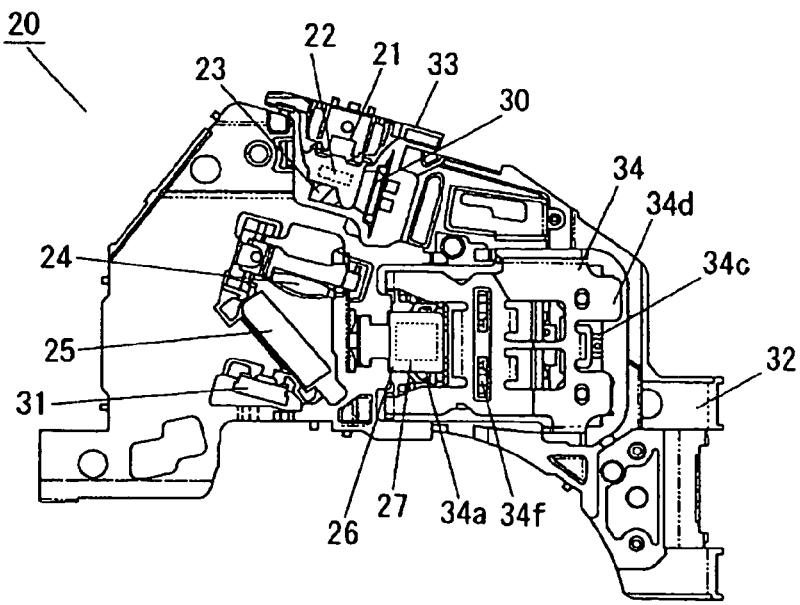

First, the structure will be described. As shown in FIG. 12, in Embodiment 6, the optical pickup device 20 is configured such that various components are disposed on a carriage 32. A dual-wavelength semiconductor laser 21, a diffractive element 22, an integrated optical member 23, and a first optical receiver 30 are fixed to a coupling base 33, and the coupling receiver 33 is fixed to the carriage 32. A collimating lens 24, a BS plate 25, a rising prism 26, a second optical receiver 31 are directly attached to the carriage 32 or attached thereto by means of an attaching member. A hologram element 27 and an objective lens 28 are attached a lens holder 34$a$ of an actuator 34, and the actuator 34 is fixed to the carriage 32.

The dual-wavelength semiconductor laser 21 that is a light source having a plurality of light-emitting points provided in proximity to one another, has a first light-emitting point 21$a$ which emits a wavelength $\lambda 1$ of light to be used for DVDs and a second light-emitting point 21$b$ which emits a wavelength $\lambda 2$ of light to be used for CDs, both of which are at a distance of about 110 µm from each other. In Embodiment 6, although the dual-wavelength semiconductor 21 is a semiconductor laser element (so-called monolithic dual-wavelength semiconductor laser) in which an optical source having a plurality of wavelengths is integrated on one semiconductor substrate, it may be a semiconductor laser (so-called hybrid dual-wavelength semiconductor laser) in which a plurality of laser elements having different wavelengths are arranged adjacent to one another in one package. In addition, the laser beams emitted from the light-emitting points 21$a$ and 21$b$ become P-polarized light.

Figure 13:
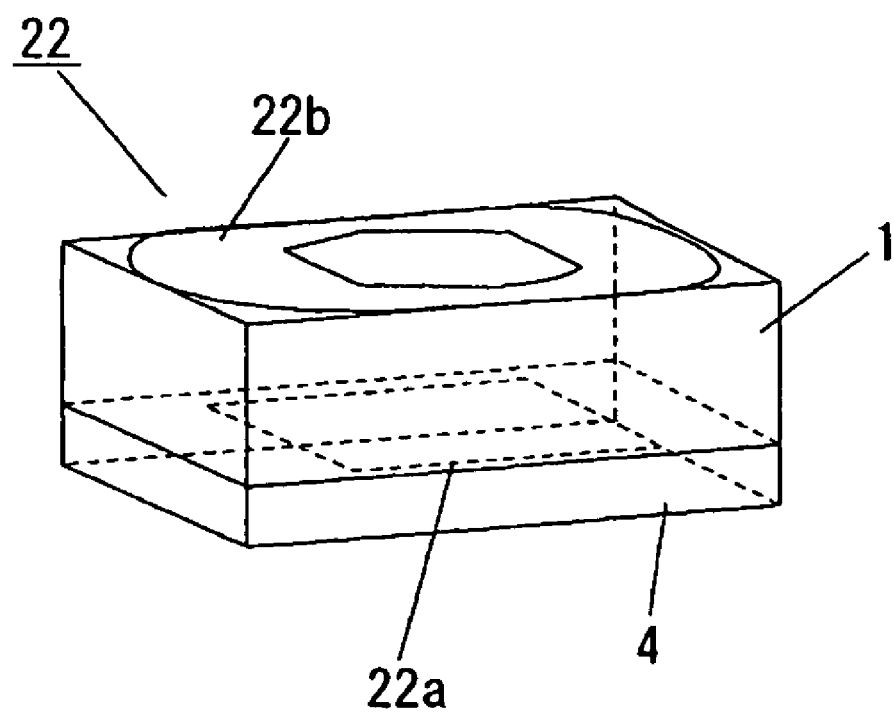
FIG. 13 shows the structure of the diffractive element of Embodiment 6.

FIG. 13 shows the structure of the diffractive element of Embodiment 6, FIG. 14A is a top plan view showing the relation between the dual-wavelength semiconductor laser and the diffractive element of Embodiment 6, FIG. 14B is a front view showing the relation between the dual-wavelength semiconductor laser and the diffractive element, and FIG. 14C is a side view showing the relation between the dual-wavelength semiconductor laser and the diffractive element. In FIG. 13 and FIG. 14C, since laser light having a wavelength λ1 and laser light having a wavelength λ2 are incident from the bottom of the figures, the up and down are reverse to those described in Embodiment 1 to Embodiment 5. The diffractive element 22 is configured such that a diffraction grating 22a is provided between a first transparent 1 and a second transparent 4, and an aperture restriction film 22b is provided on a surface of the first transparent substrate 1 opposite to its surface where the first diffraction grating 22a is provided. In the diffractive element 22, the diffraction grating 22a transmits a wavelength λ1 of light for DVDs without any change and splits a wavelength λ2 of light for CDs into three light beams to be used for tracking control. Moreover, the aperture restriction film 22b shields unnecessary light beams. The three light beams are one beam (zeroth-order light: hereinafter referred to as main beam) having a large quantity of light, and two beams (plus/minus first-order light: referred to as side beams) having a small quantity of light.

A material to be used, a structure, a fabricating method of the diffractive element 22 except for the aperture restriction film 22b are the same as those of the diffractive elements which have been described in Embodiment 1 to Embodiment 5, and thus the description thereof will be incorporated herein. Accordingly, since the refractive indexes of the first member 2 and the second member 3 with respect to a wavelength λ1 of light used for DVDs are almost the same, the wavelength λ1 of light for DVDs transmits through the first and second members without change as one beam. On the other hand, since a difference is provided between the refractive indexes of the first member 2 and the second member 3 with respect to a wavelength λ2 of light used for CDs, the wavelength λ2 of light for CDs can be split into one main beam and two side beams.

Figure 14:
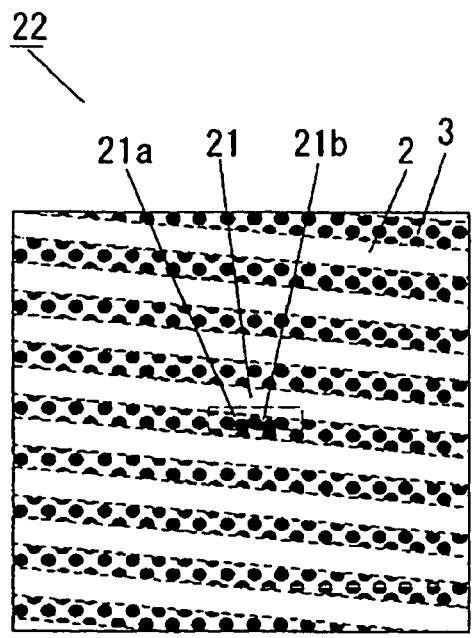
FIG. 14A is a top plan view showing the relation between the dual-wavelength semiconductor laser and the diffractive element of Embodiment 6.
FIG. 14B is a front view showing the relation between the dual-wavelength semiconductor laser and the diffractive element.
FIG. 14C is a side view showing the relation between the dual-wavelength semiconductor laser and the diffractive element.
Figure 14:
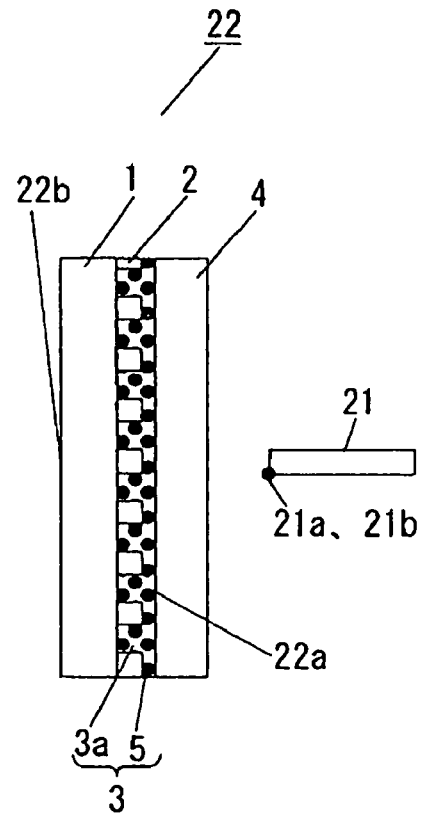
Figure 14:
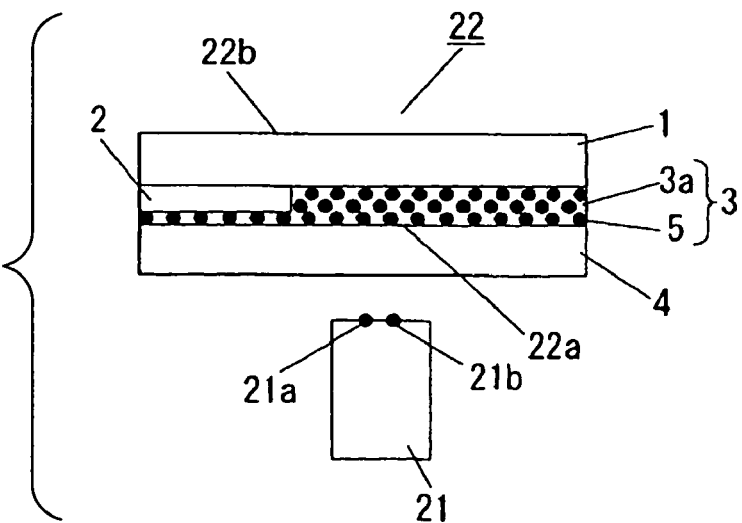

As shown in FIG. 14, in the diffractive element 22, the diffraction grating 22a is formed such that first members 2 and second members 3 are alternately arranged parallel to each other in stripes within an incidence plane of laser beams, between the first transparent substrate 1 and the second transparent substrate 4 which are perpendicular to the optical axis of the laser beams emitted from the light-emitting points 21a and 21b for laser beams. The direction of this parallel arrangement is determined such that three laser beams are lined up at a minute angle with respect to the tangential direction of a circumference on an optical disc 29.

The pitch of the first members 2 and the second members 3 which are lined up in the diffraction grating 22a has an effect on the spacing of condensing spots of three beams which are lined up on the optical disc 29. As this pitch is broader, the spacing becomes smaller. In a case of CDs, the spacing between the zeroth-order light in the middle and the plus/minus first-order light at both ends is about 15 μm. Therefore, the pitch was set to 5.5 to 6.5 μm. However, the pitch is also determined by the distance between light-emitting points for laser beams and the diffraction grating 22a within an optical system, and changes even by wavelengths intended to be diffracted. Accordingly, the optimal pitch changes within a range of 3 to 10 μm depending on design of the optical system. In addition, the width of the first member 2 and the width of the second member 3 are almost the same.

As described in Embodiment 1, as the depth of the diffraction grating 22a gets shallow, it is possible to obtain a rectangular shape having an almost ideal pattern section close to design. In order to obtain the rectangular shape having an almost ideal pattern section, the depth of the diffraction grating is required to be 8 μm or less. Also, if the depth of the diffraction grating is set to 10 μm or less, it is possible to obtain a rectangular shape having a pattern section within a range in which there is no unevenness in characteristics. Also, if the depth of the diffraction grating is set to 11 μm or less, it is possible to use a rectangular shape which has a certain degree of unevenness in characteristics and also takes manhours. Also, the depth of the diffraction grating changes depending on a refractive index difference within the diffraction grating and changes even depending on the spectral ratio of the zeroth-order light and the plus/minus first-order light needed as a diffractive element.

The aperture restriction film 22b is provided on a surface (a surface facing the integrated optical member 23) of the first transparent substrate 1 opposite to its surface which the diffraction grating 22a is provided. For example, the aperture restriction film 22b is configured such that an $SiO_2$ film and at least one of an Si film and a Ti film are alternately laminated multiple times. The aperture restriction film 22b has an aperture. The light which has entered the aperture restriction film 22b is absorbed, and the light which has entered the aperture is transmitted. In other words, since only the laser light which has entered the aperture of the aperture restriction film 22b is transmitted, laser light having a desired sectional shape can be obtained. In addition, in Embodiment 6, although aperture restriction is performed by providing the aperture restriction film 22b, an arbitrary aperture restriction portion may be provided. For example, a sheet-like aperture restriction member or other opaque block may be adhered to the first transparent substrate 1. The aperture shape of the aperture restriction film 22b may be a substantially square, circular, elliptical, oval or polygonal shape according to the situation of optical design of the optical pickup device.

The integrated optical member 23 is fabricated of optical glass within which a plurality of inclined planes 23a, 23b and 23c are provided. The inclined planes 23a and 23b are formed with polarized light separating films 23d and 23e, respectively, and the inclined plane 23c is formed with a hologram 23f. The polarized light separating film 23d to be formed on the inclined plane 23a transmits P-polarized laser light and reflects S-polarized laser light having a wavelength λ1. Also, the polarized light separating film 23e to be formed on the inclined plane 23b transmits P-polarized laser light, transmits S-polarized laser light having a wavelength λ1, and reflects S-polarized laser light having a wavelength λ2. The hologram 23f splits a wavelength λ2 of a beam so that an RF signal for CDs, a tracking error signal, and a focusing error signal are generated by the first optical receiver 30.

The collimating lens 24 is a lens which makes laser beams as divergent light in an outgoing light path emitted from the dual-wavelength semiconductor laser 21 substantially parallel to each other, and converts laser beams, which are reflected from a recording surface of the optical disc 29 and are substantially parallel light beams in a returning light path, into converging light. The collimating lens 24 is fabricated of optical glass, optical plastic, or the like.

The BS plate 25 is fabricated of optical glass or the like. The surface of the BS plate which faces the dual-wavelength semiconductor laser 21 is formed with a BS film. The BS film transmits only a portion of P-polarized laser light and reflects most of the P-polarized laser beam. Also, the BS film reflects S-polarized laser light totally. In addition, BS is an abbreviation of beam splitter. The BS film is a polarized light separating film and a dielectric multilayer film.

The rising prism 26 raises an optical axis, which has been within the plane substantially parallel to the surface of the optical disc 29 up to then, substantially perpendicularly with respect to the optical disc 29. Although the rising prism is employed in Embodiment 6, a rising mirror may be employed.

The hologram element 27 consists of a polarizing hologram 27a and a ¼ wavelength plate 27b. The polarizing hologram 27a is fabricated of material having wavelength selectivity so as to act on only a wavelength of light for DVDs in a returning light path, and splits a wavelength λ1 of a beam so that an RF signal for DVDs, a tracking error signal, or a focusing error signal are generated by the first optical receiver 30. Also, the ¼ wavelength plate 27b has a refractive index and a thickness that are set so as to act on wavelengths for both DVDs and CDs.

The objective lens 28 is a bifocal objective lens which is configured to focus a wavelength λ1 of light that is emitted from the light-emitting point 21a to be used for DVDs and a wavelength λ2 of light that is emitted from the light-emitting point 21b to be used for CDs, respectively. As the bifocal objective lens, a combination of a condensing lens and a Fresnel lens or a hologram lens, a combination in which a condensing lens for DVDs is provided with an aperture restriction means at the time of reproducing of CDs, etc. can be used.

As the optical disc 29, there are CDs, CD-ROMs and CD-R/RWs for CDs, and DVDROMs, DVD-R/RWs and DVD-RAMs for DVDs. All these optical discs for both CDs and DVDs except for reproducing-only media can perform not only recording but also reproducing. Also, although the optical discs for CDs and DVDs are used in Embodiment 6, even combinations with so-called BDs or HDDVDs, as well as combinations of CDs and DVDs, will not lost their generality.

Figure 15:
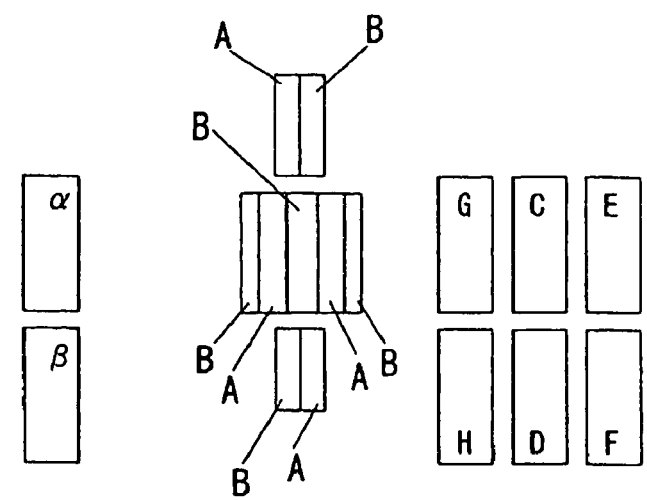
FIG. 15A shows one exemplary arrangement of light-receiving parts of the first optical receiver of Embodiment 6.
FIG. 15B shows another exemplary arrangement of the light-receiving parts.
Figure 15:
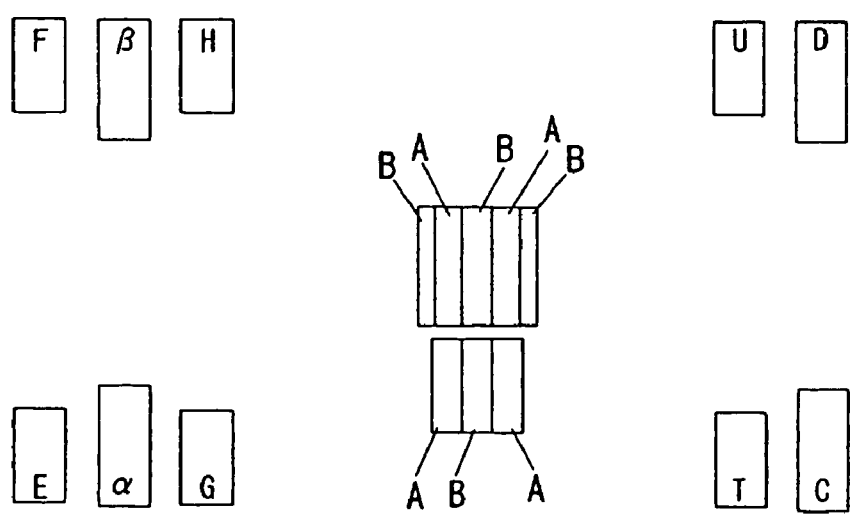

The first optical receiver 30 which receives the reflected light from the optical disc 29 to generate electrical signals is a light-receiving element which receives the reflected light from the optical disc 29 and outputs electrical signals to generate an RF signal, a tracking error signal, a focusing error signal, etc. FIG. 15A shows the structure of one exemplary arrangement of light-receiving parts of the first optical receiver of Embodiment 6, and FIG. 15B shows the structure of another exemplary arrangement of the light-receiving parts. As shown in FIGS. 15A and 15B, the first optical receiver 30 is divided into several light-receiving parts. The above various signals are generated according to the quantity of light which has entered each of the light-receiving parts denoted by A to H, α, and β. In addition, the number and arrangement of the light-receiving parts are selected optimally depending on a method of controlling tracking or focusing, a beam processing method, such as splitting a beam to generate various signals, as in the polarizing hologram 27a, the hologram 23f, etc., and the design.

In FIG. 15A, the RF signal is RF=A+B+C+D+α+β for both DVDs and CDs. In a case of DVD-RAMs, the tracking error signal TES is TES=(α+C)−(β+D) (a one-beam push-pull method). In a case of only reproducing of DVDs other than DVD-RAMs, TES=∠(C−β)+∠(α−D) (here, ∠ is phase difference), or TES =∠{(C+β)−(D+α)} (a phase difference method). The tracking error signal calculated by any of these relational expressions may be used. Also, in a case of operation involving recording and reproducing of DVDs other than DVD-RAMs, the tracking error signal is TES=(C+α)−(D+β)−K1·((E+G)−(F+H)) (an improved one-beam push-pull method). On the other hand, the tracking error signal TES of CDs is TES=(C+α)−(D+β)−K2·((E+G)−(F+H)) (a three-beam differential push-pull method). K1 and K2 are integers to be determined according to setting of operation. Also, the focusing error signal FES is generated by a double knife-edge method for DVDs, and an astigmatic method for CDs. Both of this methods are expressed as FES=A−B. It should be noted herein that different tracking error signals are used in CDs and DVDs. This is because a three-beam method which uses all the main beam and the side beams split by the diffractive element 22 is used in CDs, whereas a one-beam method which uses only the main beam according to types of discs is used in DVDs.

Also, referring to FIG. 15B, in a case of operation involving recording and reproducing of DVDs other than DVD-RAMs, the tracking error signal is TES=(C+α)−(D+β)−K1·((E+G+T)−(F+H+U)) (an improved one-beam push-pull method). Also, the tracking error signal TES of CDs is TES=(C+α)−(D+β)−K2·((E+G+T)−(F+H+U)) (a three-beam differential push-pull method). Also, as for both DVDs and CDs, the focusing error signal is generated by an astigmatic method. Thus method is expressed as FES=A−B. Except for the above three points, the other signals are the same as those in FIG. 15A.

The second optical receiver 31 is an optical sensor which converts a portion of laser light from the dual-wavelength semiconductor laser 21 into electrical signals and feedbacks the result through a control circuit (not shown) to the dual-wavelength semiconductor laser 21, thereby serving to keep the quantity of light of the dual-wavelength semiconductor laser 21 constant.

The carriage 32 forms a skeleton of the optical pickup device 20. The components constituting the optical pickup device 20, including various optical members, are directly attached to the carriage 32 or attached thereto by means of an attaching member. The carriage 32 is formed of alloy material, such as Zn alloy or Mg alloy, or hard resin material, etc.

Figure 16:
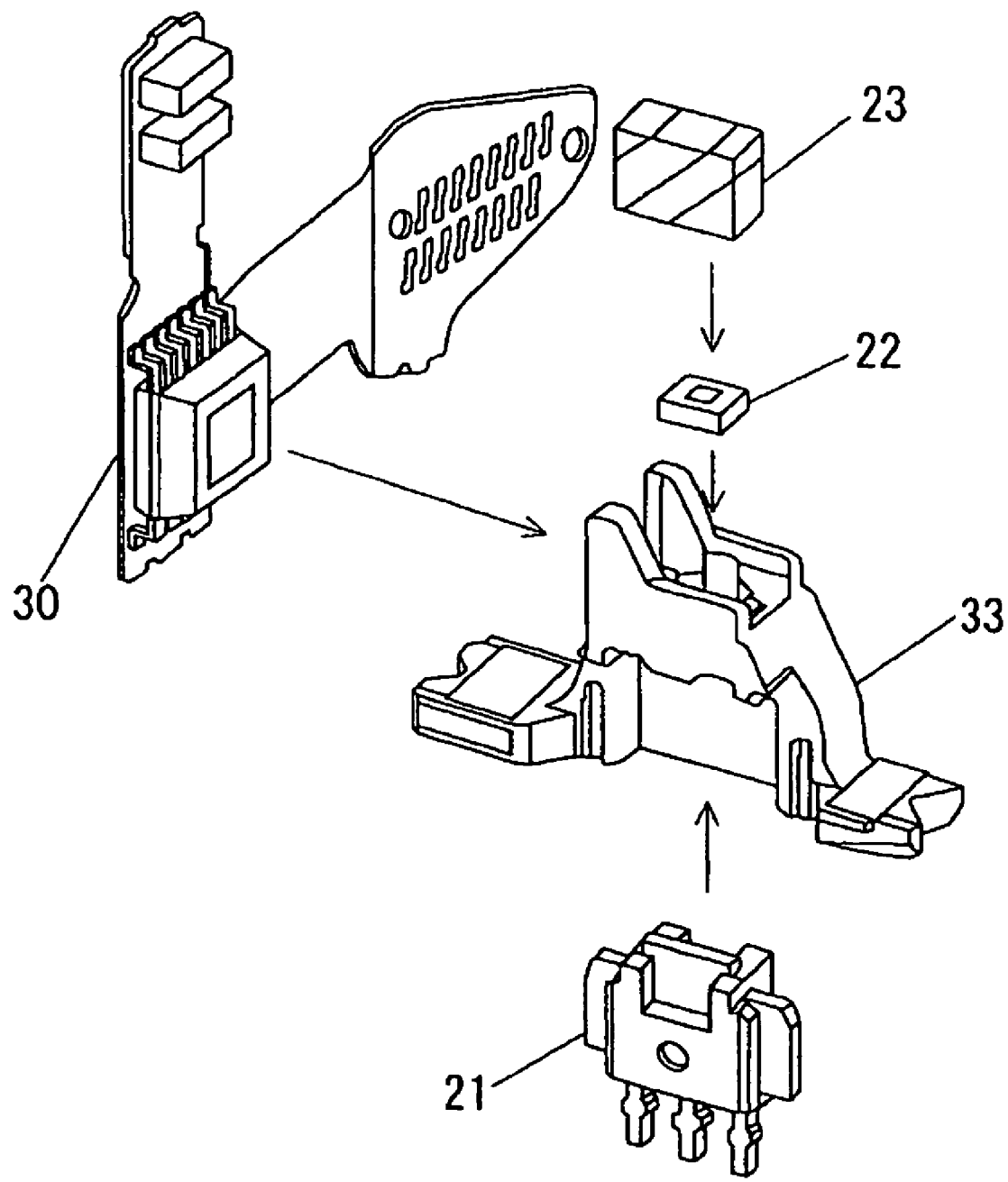
FIG. 16 shows a state in which respective components are fixed to the coupling base of Embodiment 6.

FIG. 16 shows a state in which respective components are fixed to the coupling base of Embodiment 6. The coupling base 33 fixes the dual-wavelength semiconductor laser 21, the diffractive element 22, the integrated optical member 23, and the first optical receiver 30 in predetermined positions, as shown in FIG. 16, and is fixed to the carriage 22, as shown in FIG. 12. The material for forming the coupling base 33 is required to has a shape workability that can realize comparatively light-weight and high-precision finishing dimensions, an excellent heat-radiation property, etc. Therefore, Zn, Zn alloy, Al, Al alloy, Ti, Ti alloy, etc. are preferably used as the material for forming the coupling base. In Embodiment 6, the coupling base was fabricated of Zn diecast in consideration of costs, etc.

Figure 17:
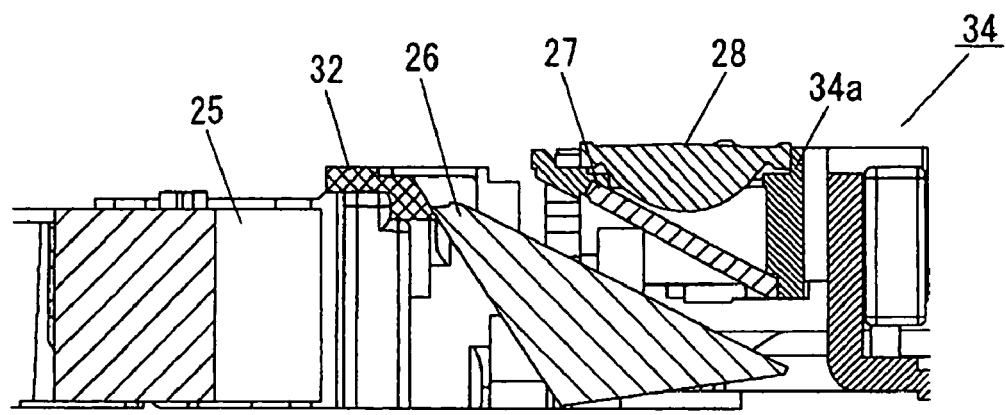
FIG. 17 is a sectional view of the vicinity of the objective lens of Embodiment 6.
Figure 18:
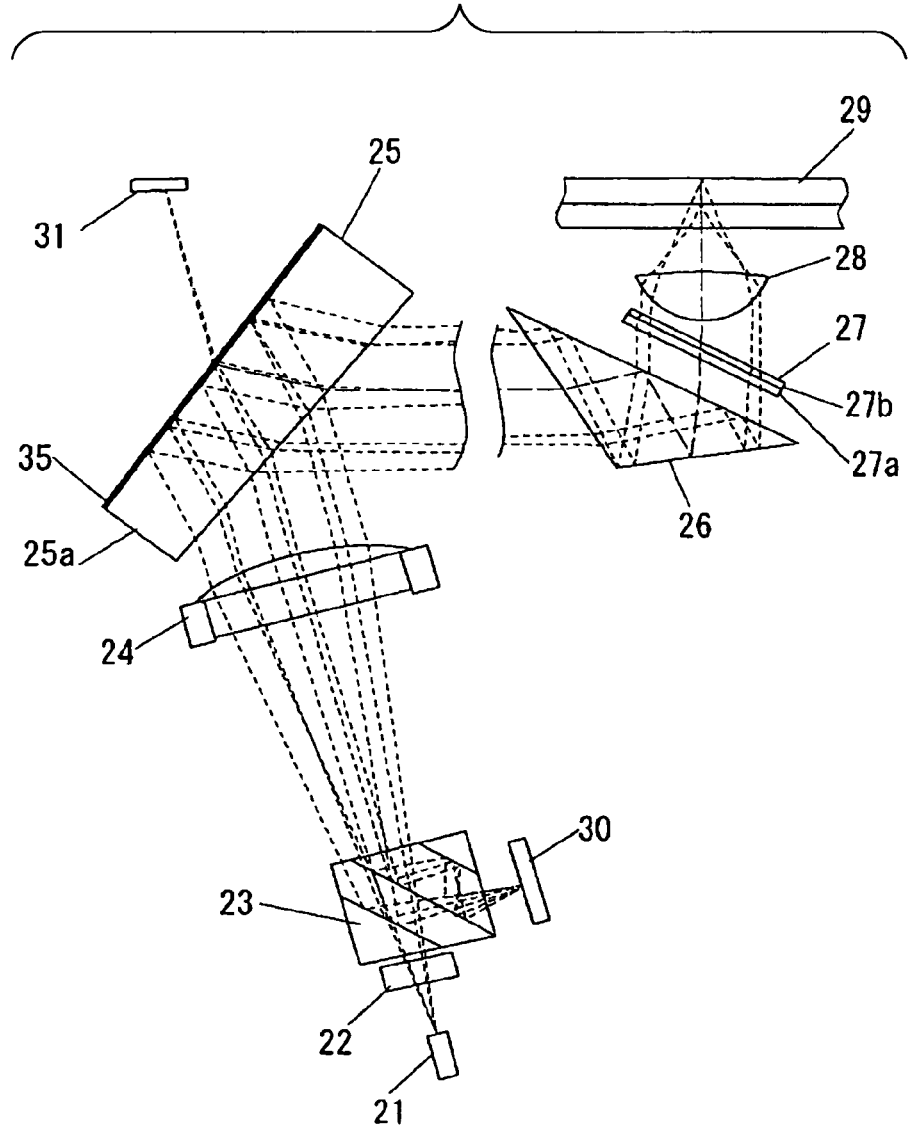
FIG. 18 schematically shows the structure of an optical system of an optical pickup device of Embodiment 7.

The actuator 34, as shown in FIG. 12, has a yoke 34d, a fixing part 34c, suspension wires 34b, and a lens holder 34a. The fixing part 34c is fixed to the yoke 34d. The lens holder 34c is movably supported by the fixing part 34c through the suspension wires 34b. In this case, the lens holder 34a touches only the suspension wires 34b. FIG. 17 is a sectional view of the vicinity of the objective lens of Embodiment 6. As shown in FIG. 17, the hologram element 27 is fixed to a lens holder 34a from the bottom face of the lens holder 34a and the objective lens 28 is fixed to the lens holder 34a from the top face of the lens holder 34a. Also, a magnet 34e is attached to the yoke 34d, and a coil 34f is attached to the lens holder 34a. The actuator 34 is fixed to the carriage 32 with adhesive. The actuator 34 contacts the carriage 32 with the adhesive therebetween. The actuator 34 actuates the objective lens 28 by allowing a current to flow into the coil 34f and generating an electromagnetic force with the magnet 34e so that condensing spots are focused on a track of a recording surface of the optical disc 29 by a focusing servo and a tracking servo.

Next, the optical path will be described. As shown in FIG. 11, the light emitted from the light-emitting point 21a having a wavelength λ1 for DVDs passes through the diffractive element 22 and the integrated optical member 23 and enters the collimating lens 24. The wavelength λ1 of light transmits through the diffractive element 22 without any change as described above. Since the light is P-polarized light in the integrated optical member 23, it transmits therethrough without any change. In the collimating lens 24, divergent light is converted to substantially parallel beams which in turn enters the BS plate 25. A portion of the light transmits through the BS plate 25 and enters the second optical receiver 31, while the remaining portion of the light is reflected and enters the rising prism 26. The light which has entered the second optical receiver 31 is converted into electrical signals to be used for controlling the light quantity of the light-emitting point 21a having a wavelength λ1. The light which has entered the rising prism 26 passes through the hologram element 27 and the objective lens 28 and is focused on a recording surface of the optical disc 29.

When the light transmits through the hologram element 27, the polarized direction of the light is set such that it transmits through the hologram element without any change without receiving any influence of the polarizing hologram 27a. In the ¼ wavelength plate 27b, linearly polarized light of P-polarization is converted to circularly polarized light. In the objective lens 28, substantially parallel beams are converted to condensing light.

The light reflected by the recording surface of the optical disc 29 passes through the objective lens 28, the hologram element 27, the rising prism 26, the BS plate 25 and the collimating lens 24, and enters the integrated optical member 23. In the objective lens 28, divergent light is converted to substantially parallel beams. When the beams transmits through the hologram element 27 again, the ¼ wavelength plate 27b converts circularly polarized light to linearly polarized light, which is perpendicular to the outgoing linearly-polarized light, that is, S-polarized light. The light is split into optic signal components corresponding to an RF signal, a tracking error signal, a focusing error signal, etc. by the polarizing hologram 27a. The light is totally reflected in the BS plate 25. In the collimating lens 24, substantially parallel beams are converted to condensing light.

The light which has entered the integrated optical member 23 first enters the polarized light separating film 23e provided on the inclined plane 23b within the integrated optical member 23. Since the polarized light separating film 23e transmits S-polarized light having a wavelength λ1, the light transmits through the film without any change and enters the polarized light separating film 23d provided on the inclined plane 23a. The polarized light separating film 23d employs the structure of a polarized light separating film to reflect S-polarized light having a wavelength λ1. Therefore, the light which has entered the integrated optical member 23 is reflected by the polarized light separating film 23d provided on the inclined plane 23a, and enters the first optical receiver 30. Respective optic signal components which have been split by the polarizing hologram 27a and have entered the first optical receiver 30 are converted into various electrical signals by the first optical receiver 30.

The light emitted from the light-emitting point 21b having a wavelength λ2 for CDs passes through the diffractive element 22 and the integrated optical member 23 and enters the collimating lens 24. In the diffractive element 22, the wavelength λ2 of light is split into one main beam and two side beams as described above. Since the light is P-polarized light beams in the integrated optical member 23, it transmits therethrough without any change. In the collimating lens 24, divergent light is converted to substantially parallel beams and enters the BS plate 25. A portion of the light transmits through the BS plate 25 and enters the second optical receiver 31, while the remaining portion of the light is reflected and enters the rising prism 26. The light which has entered the second optical receiver 31 is converted into electrical signals to be used for controlling the light quantity of the light-emitting point 21b having a wavelength λ2. The light which has entered the rising prism 26 passes through the hologram element 27 and the objective lens 28 and is focused on the optical disc 29. When the light transmits through the hologram element 27, the wavelength λ2 of light transmits through the hologram element without any change without receiving any influence of the polarizing hologram 27a. In the ¼ wavelength plate 27b, linearly polarized light of P-polarization is converted to circularly polarized light. In the objective lens 28, substantially parallel beams is converted to condensing light.

The light reflected by the optical disc 29 passes through the objective lens 28, the hologram element 27, the rising prism 26, the BS plate 25, and the collimating lens 24, and enters the integrated optical member 23. In the objective lens 28, divergent light is converted to substantially parallel beams. When the beams transmits through the hologram element 27 again, the ¼ wavelength plate 27b converts circularly polarized light to linearly polarized light, which is perpendicular to the outgoing linearly-polarized light, that is, S-polarized light. Since the wavelength λ2 of light does not receive any influence of the polarizing hologram 27a, it transmits through the polarizing hologram 27a without any change. The light is totally reflected in the BS plate 25. In the collimating lens 24, substantially parallel beams are converted to condensing light.

The polarized light separating film 23e provided on the inclined plane 23b within the integrated optical member 23 employs a film structure to reflect a wavelength λ2 of light. Therefore, the light which has entered the integrated optical member 23 is reflected by the polarized light separating film 23e provided on the inclined plane 23b, and is split by the hologram 23f provided on the inclined plane 23c. The split light enters the first optical receiver 30 and is converted into various electrical signals.

The diffractive element 22 has a high transmittance in any of the wavelengths λ1 and λ2. Hence, the light quantity in the optical disc 29 is large even in the same laser output. Hence, it is possible to obtain the optical pickup device 20 to meet attainment of a high speed. In Embodiment 6, the dual-wavelength semiconductor laser 21 in which a plurality of light-emitting points are provided in proximity to one another is employed as the light source. Since light-emitting points of DVDs and CDs exist in proximity to one another in the dual-wavelength semiconductor laser 21, it is difficult to pass only the light for CDs through the diffractive element, and the light for DVDs is also passed through the diffractive element and split into three beams. Since one beam is used as the tracking error signal of DVDs, the loss of light quantity is generated by the amount of the beam diffracted. However, since the diffractive element 22 of the invention trnamits the light of DVDs without any change as one beam and diffract and split the light of CDs, the loss of light quantity can be minimized. Also, since the organic matter 5 dissolved at a molecular level is used, the transmittance in a wavelength to be used is also high and thus the loss of light quantity is smaller. As such, the diffractive element 22 of the invention shows remarkable effects in the optical pickup device 20 using the dual-wavelength semiconductor laser 21.

In addition, although Embodiment 6 has been described about the optical pickup device 20 in which a wavelength λ1 of light is used for DVDs and a wavelength λ2 of light is used for CDs, the invention is not limited thereto. For example, if the optical system of the optical pickup device of Embodiment 6 is provided with a light source having a wavelength for BDs or HDDVDs, an optical receiver, and an optical system which guides the light from the light source to an optical disc and guides the light reflected by the optical disc to the optical receiver, it is possible to obtain the optical pickup device 20 corresponding to three wavelengths for BDs or HDDVDs, DVDs and CDs. Also, when light is absorbed in a range having a shorter wavelength than a wavelength λ1 and the wavelength λ1 is approximately 405 nm, if the organic matter 5 of the diffractive element 22 employs copper chlorophilline sodium or the like, it is possible to obtain the optical pickup device 20 for BDs or HDDVDs and CDs.

Embodiment 7

Figure 19:
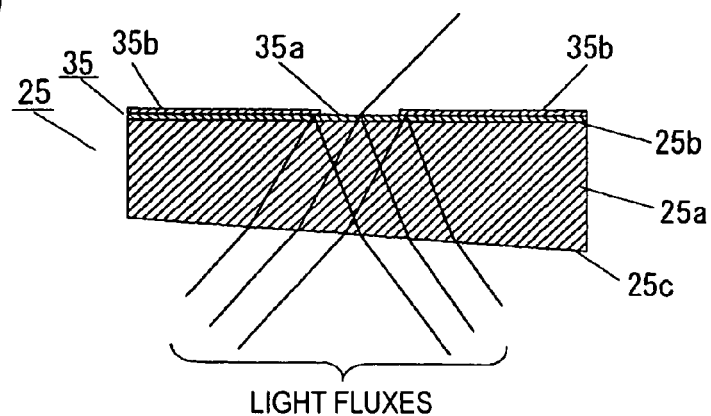
FIG. 19A is a front sectional view of a BS plate of Embodiment 7.
FIG. 19B is a top plan view of the BS plate.
FIG. 19C is a top plan view of another example of the BS plate.
Figure 19:
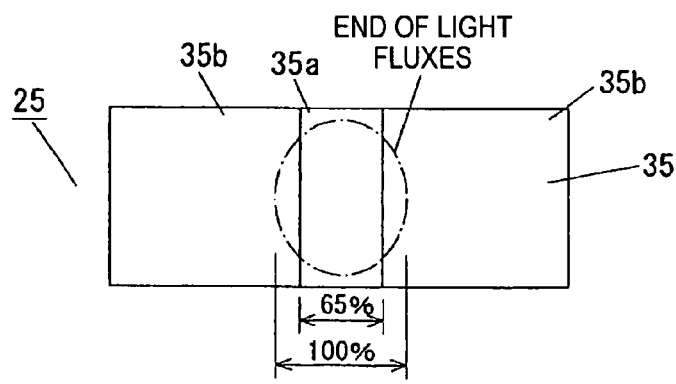
Figure 19:
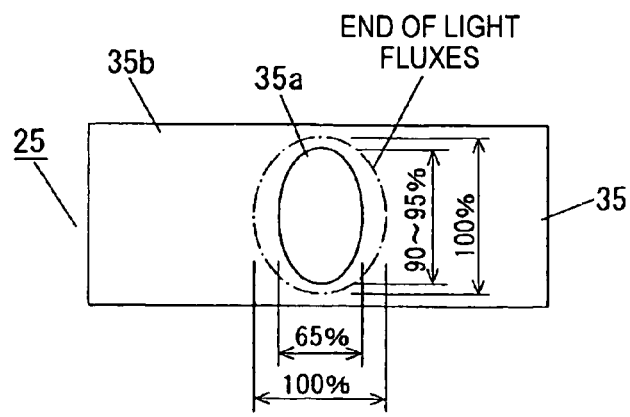
Figure 20:
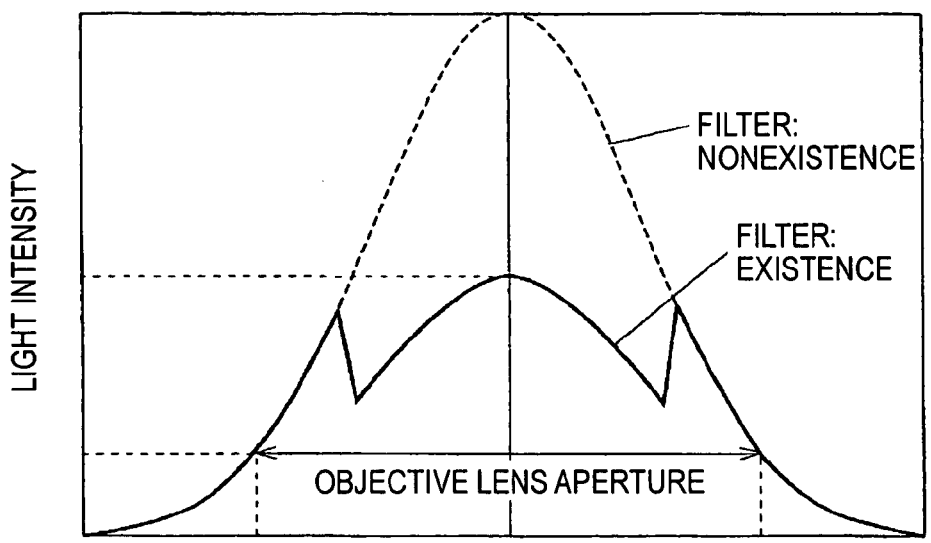
FIG. 20A is a comparison graph of the light intensity distribution depending on the existence and nonexistence of a filter on an aperture plane of an objective lens of Embodiment 7.
FIG. 20B is a comparison graph of the light intensity distribution depending on the existence and nonexistence of a filter on a recording surface of an optical disc.
Figure 20:
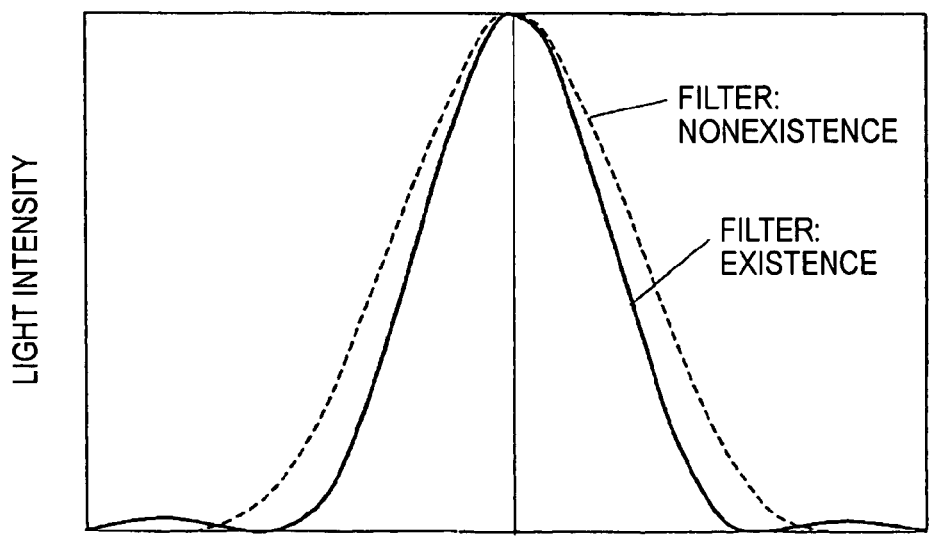

Embodiment 7 of the invention will be described referring to the accompanying drawings. FIG. 19 shows the structure of an optical system of an optical pickup device of Embodiment 7. FIG. 19A is a front sectional view of a BS plate of Embodiment 7, FIG. 19B is a top plan view of the BS plate, and FIG. 19C is a top plan view of another example of the BS plate. FIG. 20A is a comparison graph of the light intensity distribution depending on the existence and nonexistence of a filter on an aperture plane of an objective lens of Embodiment 7, and FIG. 20B is a comparison graph of the light intensity distribution depending on the existence and nonexistence of a filter on a recording surface of an optical disc. In Embodiment 7, the other components except for the BS plate 25 are the same as those in Embodiment 6, and thus the description thereof will be incorporated herein.

The BS plate 25 has a substrate 25a and a filter 35. The substrate 25a is fabricated of optical glass, optical plastic, or the like. A reflection-preventing film is formed on a surface 25c of the substrate 25a which faces the dual-wavelength semiconductor laser 21, and a filter 35 is formed on the surface 25b of the substrate which does not face the dual-wavelength semiconductor laser 21. The filter 35 consists of a wavelength selection polarized-light separating film 35a in a region close to the center of light fluxes of the laser light which has entered, and a total reflection film 35b around the center. The wavelength selection polarized-light separating film 35a reflects a wavelength λ1 of P-polarized light by a predetermined reflectance of, for example, about 50%, tansmits the remaining of the wavelength λ1 of P-polarized light, and totally reflects S-polarized light. Also, the wavelength selection polarized-light separating film reflects a wavelength λ2 of P-polarized light by, for example, 95%, transmits the remaining of the wavelength λ2 of P-polarized light, and totally reflects S-polarized light. In the total reflection film 35b, both the wavelength λ1 of light and the wavelength λ2 of light are totally reflected irrespective of their polarization. The wavelength selection polarized-light separating film 35a is composed of a dielectric multilayer film. Also, the total reflection film 35b is composed of a dielectric multilayer film or a metal film. In a case of FIG. 19B, a region within about 65% of a beam distribution region in the direction corresponding to the radial direction of the optical disc 29 is defined as the region of the wavelength selection polarized-light separating film 35a, and a straight line in the direction corresponding to the tangential direction of a circumference is defined as a boundary line with the total reflection film 35b. In other words, the region of the wavelength selection polarized-light separating film has a strip shape. Also; as shown in FIG. 19C, the region of the wavelength selection polarized-light separating film may be an elliptical region within about 90% to 95% of the beam distribution region in the direction corresponding to the tangential direction of the circumference of the optical disc 29. The light which has transmitted through the wavelength selection polarized-light separating film 35a enters the second optical receiver 31 so as to be used for controlling the light quantity of laser light to be emitted from the dual-wavelength semiconductor laser 21.

The light intensity distribution of a wavelength λ1 of laser light in the aperture plane of the objective lens 28, as indicated by a solid line in FIG. 20A, shows that the light intensity of a central portion of the light fluxes becomes as small as about 50% of the light quantity when the laser light does not pass through the filter 35. If the light fluxes having such a light intensity distribution are condensed on the recording surface of the optical disc 29, as indicated by a solid line in FIG. 20B, the size of a spot condensed becomes smaller than that when the light fluxes do not pass through a filter. Such a phenomenon is referred to as super-resolution phenomenon. By appropriately designing the reflectance or its range of the wavelength selection polarized-light separating film 35a so as to conform to the optical system, the size of a spot can be made small, and the upsurge of the light quantity around the spot, which is called side robe, can be made small. On the other hand, since the quantity of light having a wavelength λ2 is about 95%, it receives little influence. Therefore, it takes light intensity distributions close to dotted lines in FIGS. 20A and 20B.

Also, the surface 25c of the BS plate 25 which faces the dual-wavelength semiconductor laser 21 and the surface 25b of the BS plate which does not face the dual-wavelength semiconductor laser were made non-parallel to each other at an angle of, for example, about 1.1°. This is because the light which has passed the inside of the BS plate 25, i.e., the substrate 25a does not cause interference.

The diffractive element 22 of Embodiment 7 is the same as the diffractive element 22 of Embodiment 6, and has a high transmittance in any of the wavelengths λ1 and λ2. Hence, the light quantity in the optical disc 29 is large even in the same laser output. Hence, it is possible to obtain the optical pickup device 20 to meet attainment of a high speed. Moreover, since the spot size of a wavelength λ1 of light on the recording surface of the optical disc 29 can be made small by the effect of the filter 35, the aberration can be suppressed to a low value. On the other hand, since conversion is not performed on a wavelength λ2 of light which does not require such conversion, the light utilization efficiency will not be lowered. By doing so, it is possible to implement condensing spots which are optimal for the light from the light-emitting point 21a having a wavelength λ1 and the light from the light-emitting point 21b having a wavelength λ2, without adding new, independent optical members. Accordingly, it is possible to implement an optical pickup device using the dual-wavelength semiconductor laser 21 that even the light from a light-emitting point having a certain wavelength can perform both recording and reproducing at a high speed, while utilizing a feature of low cost.

Embodiment 8

Figure 21:
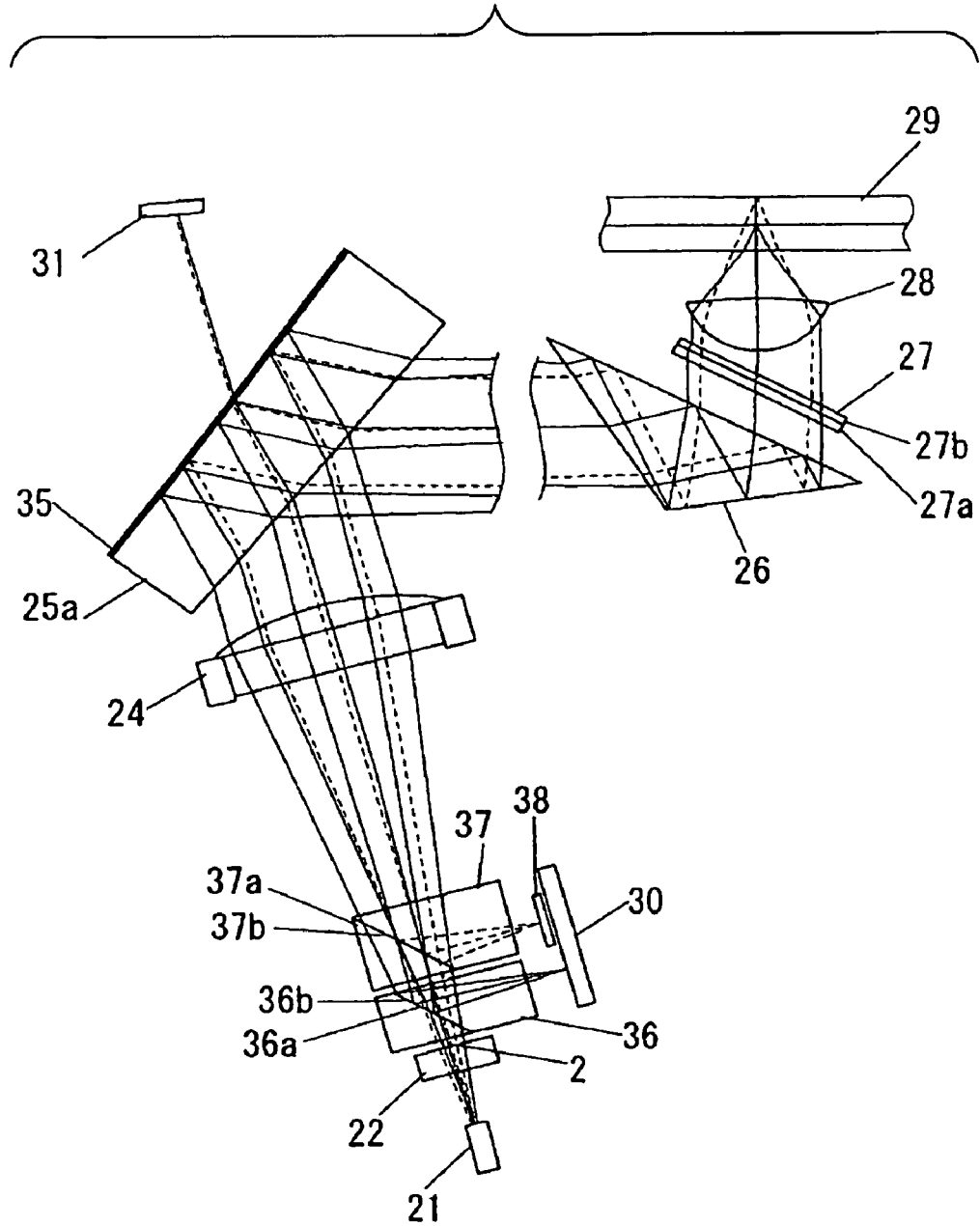
FIG. 21 schematically shows the structure of an optical system of an optical pickup device of Embodiment 8.

Embodiment 8 of the invention will be described referring to the accompanying drawings. FIG. 21 shows the structure of an optical system of an optical pickup device of Embodiment 8. In Embodiment 8, the other components except for the integrated optical member 23 is the same as those in Embodiment 7, and thus the description thereof will be incorporated herein.

Optimal members 36 and 37 and a hologram 38 are configured to have the same function as the integrated optical member 23. The optical member 36 has an inclined plane 36a therein. The inclined plane 36a is formed with a polarized light separating film 36b. The optical member 36 is fabricated of optical glass. The polarized light separating film 36b transmits P-polarized laser light and reflects S-polarized laser light having a wavelength λ1.

The optical member 37 has an inclined plane 37a therein. The inclined plane 37a is formed with a polarized light separating film 37b. The optical member 37 is fabricated of optical glass. The polarized light separating film 37b transmits P-polarized laser light, transmits S-polarized laser light having a wavelength λ1, and reflects S-polarized laser light having a wavelength λ2.

The hologram 38 is provided on the surface of a window which is spaced away from a light-receiving surface of the first optical receiver 30 and which faces the optical member 37. The hologram 38 may be disposed in an appropriate position between the surface of the first optical receiver 30 which receives laser light for CDs, and the polarized light separating film 37b. Therefore, the hologram may be provided on the surface of the optical member 37 which faces the first optical receiver 30.

Since the laser light emitted from the light-emitting point 21a having a wavelength λ1 is P-polarized light, it transmits through the polarized light separating film 36b of the inclined plane 36a of the optical member 36, transmits through the polarized light separating film 37b of the inclined plane 37a of the optical member 37, and enters the collimating lens 24. Since a wavelength λ1 of laser light reflected by the recording surface of the optical disc 29 is S-polarized light, it transmits through the polarized light separating film 37b of the inclined plane 37a of the optical member 37, is reflected by the polarized light separating film 36b of the inclined plane 36a of the optical member 36, and enters the first optical receiver 30.

Since the laser light emitted from the light-emitting point 21b having a wavelength λ2 is P-polarized light, it transmits through the polarized light separating film 36b of the inclined plane 36a of the optical member 36, transmits through the polarized light separating film 37b of the inclined plane 37a of the optical member 37, and enters the collimating lens 24. Since a wavelength λ2 of laser light reflected by the recording surface of the optical disc 29 is S-polarized light, it is reflected by the polarized light separating film 37b of the inclined plane 37a of the optical member 37, and enters the hologram 30. Light is split into various signal components by the hologram 38 and enters the first optical receiver 30.

As such, it is possible to construct an optical system of an optical pickup device without using the integrated optical member 23. In this case, since the integrated optical member becomes a single-part optical member, the whole size increases a little. However, since the integrated optical member 23 which needs to be fabricated with high precision becomes unnecessary, the cost of manufacturing can be suppressed.

Embodiment 9

Figure 22:
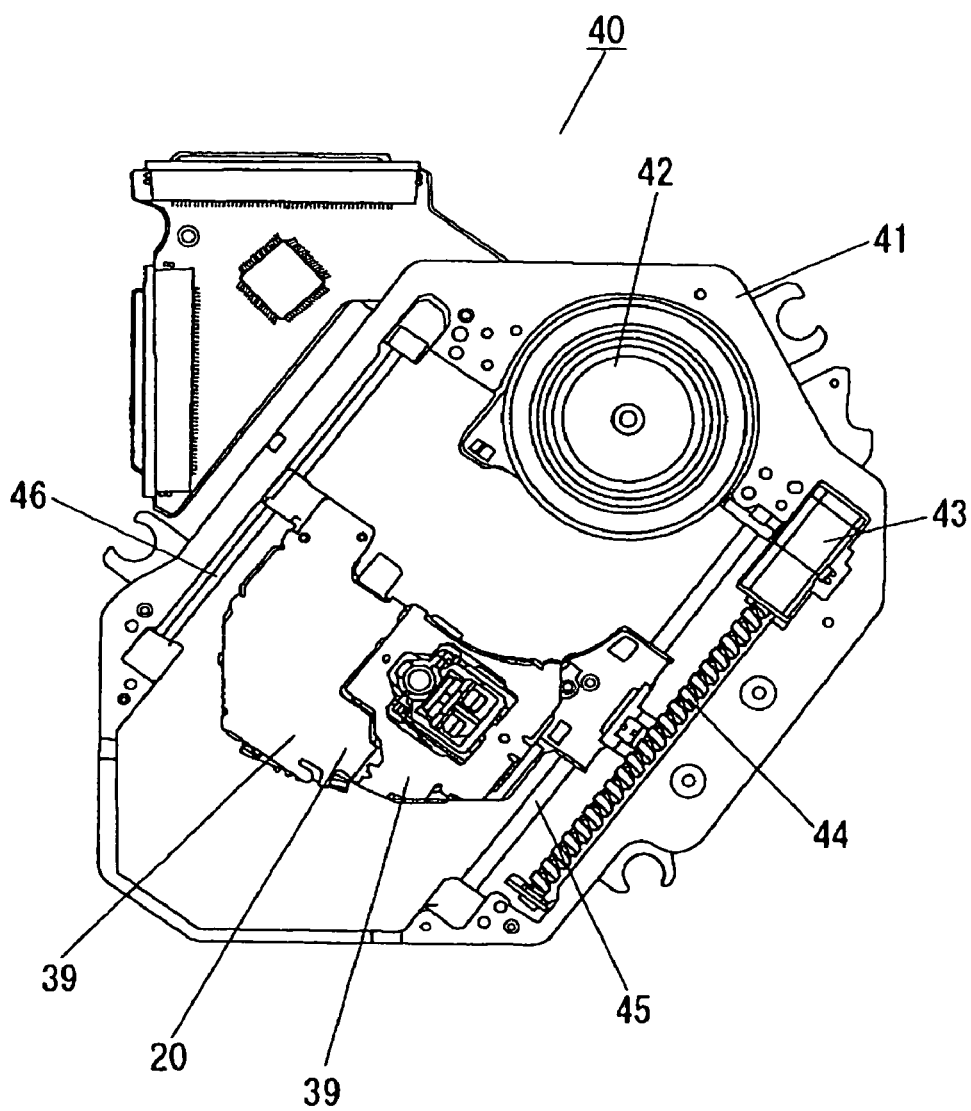
FIG. 22 shows the structure of an optical pickup module in Embodiment 9.
Figure 23:
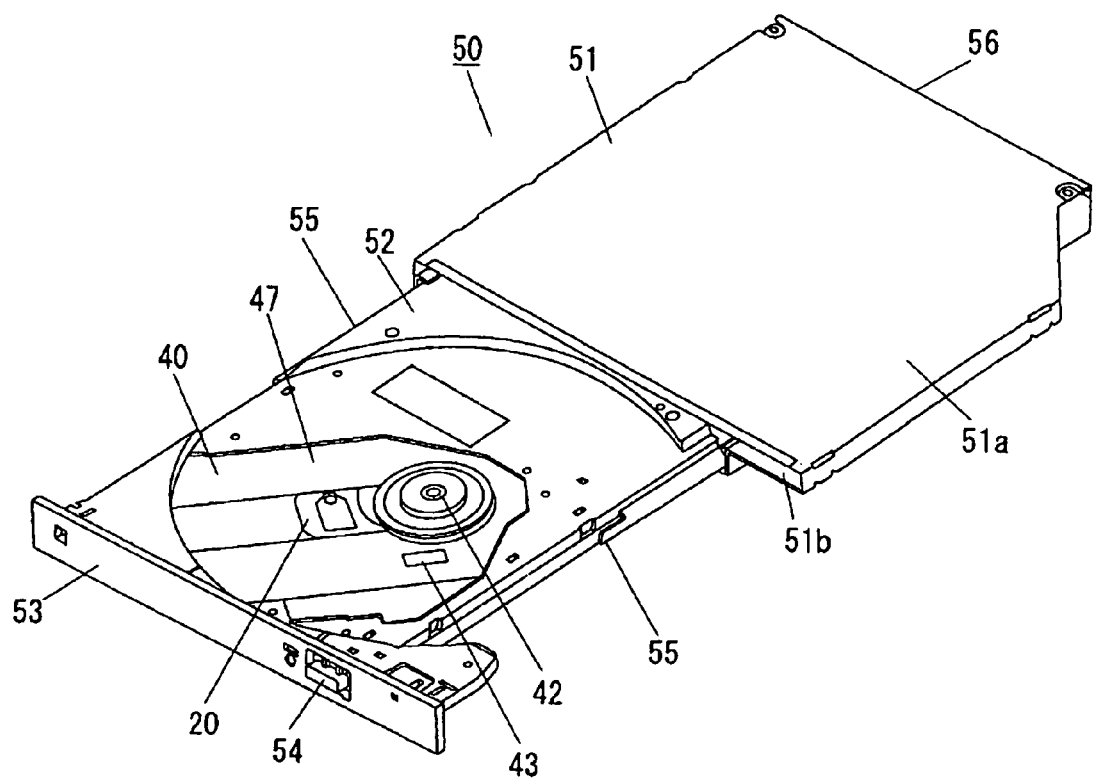
FIG. 23 is a perspective view of an optical disc apparatus in Embodiment 9 of the invention.
Figure 24:
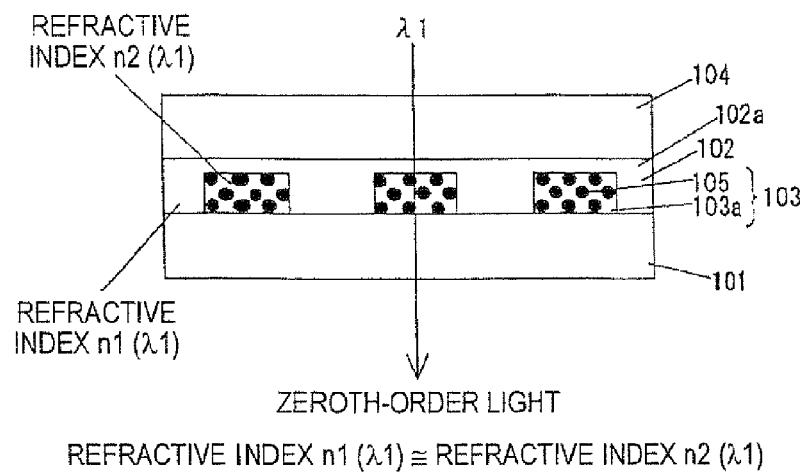
Figure 24:
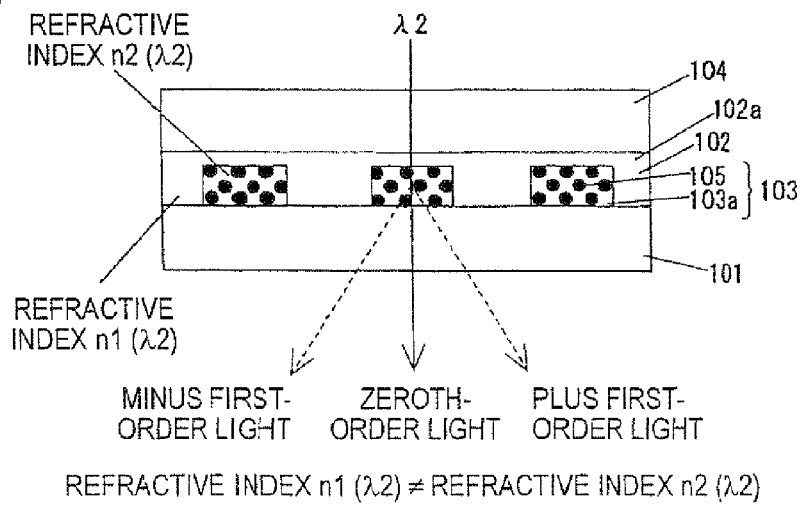

Embodiment 9 of the invention will be described referring to the accompanying drawings. FIG. 22 shows the structure of an optical pickup module in Embodiment 9, and FIG. 23 is a perspective view of an optical disc apparatus in Embodiment 9 of the invention. Embodiment 9 is an optical disc apparatus which has the optical pickup devices described in Embodiment 6 to Embodiment 8.

In FIG. 22, a driving mechanism of an optical disc apparatus 50 having a rotation-driving part to rotationally drive the optical disc 29 and a moving part to move the optical pickup device 20 toward or away from the rotation-driving part is referred to an optical pickup module 40. Since a base 40 forms a skeleton of the optical pickup module 40, the optical pickup module 40 is configured such that respective components are arranged directly or indirectly on the base 41.

The rotation-driving part includes a spindle motor 42 having a turntable on which the optical disc 29 is to be placed. The spindle motor 42 is fixed to the base 41. The spindle motor 42 generates a rotational driving force to rotate the optical disc 29.

The moving part includes a feed motor 43, a screw shaft 44, and guide shafts 45 and 46. The feed motor 43 is fixed to the base 41. The feed motor 43 generates a rotational driving force that is required when the optical pickup device 20 moves between the inner periphery and outer periphery of the optical disc 29. As the feed motor 43, a stepping motor, a DC motor, etc. are used. The screw shaft 44 is spirally grooved and is directly connected to the feed motor 43 or connected to the feed motor 42 via several stages of gears. In Embodiment 9, the screw shaft is directly connected to the feed motor 43. Each of the guide shafts 45 and 46 has both ends fixed to the base 41 via a supporting member. The guide shafts 45 and 46 movably support the optical pickup device 20. The optical pickup device 20 includes a rack having guide teeth which engage the grooves of the screw shaft 44. Since the rack converts the rotational driving force of the feed motor 43 transmitted to the screw shaft 44 to a linear driving force, the optical pickup device 20 can move between the inner periphery and outer periphery of the optical disc 29.

In addition, the rotation-driving part is not limited to the structure described in Embodiment 9, as long as it can rotate the optical disc 29 at a predetermined number of rotations. Also, the moving part is not limited to the structure described in Embodiment 9, as long as it can move the optical pickup device 20 to a predetermined position between the inner periphery and outer periphery of the optical disc 29.

The optical pickup device 20 is obtained by attaching a cover 39 to the structure of FIG. 12, and includes the diffractive element 22 described in Embodiment 6. The optical pickup device 20 either records or reproduces information on or from the optical disc 29, and emits laser light toward the optical disc 29 for that purpose. In this case, since the transmittance in the wavelength λ1 and the wavelength λ2 is high, the laser output can be increased. An adjusting mechanism constituting a supporting member adjusts the inclination of the guide shafts 45 and 46 so that the laser light to be emitted from the optical pickup device 20 enters the optical disc 29 perpendicularly thereto.

Referring to FIG. 23, a housing 51 is constructed by combining an upper housing 51a and a lower housing 51b and fixing them to each other with screws or the like. A tray 52 is retractably provided with respect to the housing 51. In the tray 52, an optical pickup module 40 to which a cover 47 is attached is disposed from the bottom face of the tray. The cover 47 has an opening which exposes a portion of the optical pickup device 20 including the objective lens 28, and the turntable of the spindle motor 42. In Embodiment 9, the opening also exposes the feed motor 43. A bezel 53 is provided on a front end face of the tray 52 and adapted to close the entrance of the tray 52 when the tray 52 is accommodated within the housing 51. The bezel 53 is provided with an eject switch 54. By pushing the eject switch 54, engagement between the housing 51 and the tray 52 is released, which makes it possible for the tray 52 to appear or disappear with respect to the housing 51. Rails 55 are slidably attached to both opposite sides of the tray 52 and the housing 51. A circuit board (not shown) is provided inside the housing 51 or the tray 52. ICs of a signal processing system, a power supply circuit, and the like are mounted on the circuit board. An external connector 56 is connected to a power supply/signal line provided in electronic equipment, such as computers. By way of the external connector 56, power is supplied into the optical disc apparatus 50, electrical signals are led into the optical disc apparatus 50 from the outside, or electrical signals generated in the optical disc apparatus 50 are sent to electronic equipment, etc.

As described above, in an optical disc apparatus equipped with any of the optical pickup devices 20 shown in Embodiment 6 to Embodiment 8 which use the diffractive elements 22 of Embodiment 1 to Embodiment 5, the light quantity in the optical disc 29 is large even in the same laser output. Hence, it is possible to obtain an optical disc apparatus to meet attainment of a high speed. The effect appears prominently in an optical disc apparatus equipped with the optical pickup device 20, particularly using the dual-wavelength semiconductor laser 21.

As described above, the diffractive element, the manufacturing method of the diffractive element, the optical pickup device, and the optical disc apparatus according to the invention have a high transmittance. Therefore, even in the same laser output, the light quantity in an optical disc is large. This effect is prominent in a system, particularly using a dual-wavelength semiconductor laser. Accordingly, the diffractive element of the invention can be utilized as a diffractive element to be mounted on an optical pickup device and an optical disc apparatus, particularly using a dual-wavelength semiconductor laser, which meets attainment of a high speed.

What is claimed is:

1. A diffractive element on which two wavelengths of light are incident from a light source, the diffractive element transmitting one of the two wavelengths of light to one type optical disc, the diffractive element splitting the other wavelength of light and emitting the split light to another type optical disc, the diffractive element comprising:
    a first member including a first resin and having a predetermined refractive index, and
    a second member having the same refractive index as the first member in the one wavelength of light and having a refractive index different from the first member in the other wavelength of light,
    wherein the first member and the second member are alternately arranged in a right-and-left direction with respect to an incidence direction of the two wavelengths of light, thereby constituting a diffraction grating, and
    wherein the second member includes organic matter having optical absorption in a predetermined wavelength range and a second resin to dissolve the organic matter at a molecular level so as to form the refractive index of the second member, wherein the organic matter is a dye, not a pigment.

2. The diffractive element according to claim 1, wherein the one wavelength of light is laser light for DVDs.

3. The diffractive element according to claim 1, wherein the other wavelength of light is laser light for CDs.

4. The diffractive element according to claim 1, wherein the second member is cured without using ultraviolet rays.

5. The diffractive element according to claim 4, wherein the second member is cured by heat.

6. The diffractive element according to claim 1, wherein the first resin of the first member is a resin which has no optical absorption in the predetermined wavelength range, whereby the predetermined refractive index of the first member is formed.

7. The diffractive element according to claim 1, wherein the predetermined wavelength range is a range having a shorter wavelength than the wavelength of a shorter wavelength of light of the two wavelengths of light.

8. The diffractive element according to claim 1, further comprising a first transparent substrate and a second transparent substrate,
    wherein the diffraction grating is formed on the first transparent substrate, and the diffraction grating is inserted between the first transparent substrate and the second transparent substrate and bonded thereto.

9. The diffractive element according to claim 1, wherein at least one of the first resin and the second resin is an adhesive.

10. The diffractive element according to claim 1, further comprising a first transparent substrate,
    wherein the diffraction grating is formed on the first transparent substrate, and either the first member or the second member is in non-contact with the first transparent substrate in at least a region constituting the diffraction grating.

11. The diffractive element according to claim 1, wherein the first member includes the first resin which dissolves, at a molecular level, the organic matter in which at least a portion of an optical absorption property in the predetermined wavelength range is lost, and does not have optical absorption in a predetermined wavelength range.

12. The diffractive element according to claim 11, wherein the first resin and the second resin are the same, the organic matter before at least a portion of an optical absorption property of the first member is lost and the organic matter of the second member are the same, and the condensation of the organic matter included in the first member and the condensation of the organic matter included in the second member are equal to each other.

13. A diffractive element on which two wavelengths of light are incident from a light source, the diffractive element transmitting one of the two wavelengths of light to one type optical disc, the diffractive element splitting the other wavelength of light and emitting the split light to another type optical disc, the diffractive element comprising:
    a first member including a first resin and having a predetermined refractive index, and
    a second member having the same refractive index as the first member in the one wavelength of light and having a refractive index different from the first member in the other wavelength of light,
    wherein the first member and the second member are alternately arranged in a right-and-left direction with respect to an incidence direction of the two wavelengths of light, thereby constituting a diffraction grating,
    wherein the second member includes a second resin to dissolve organic matter having optical absorption in a predetermined wavelength range at a molecular level so as to form the refractive index of the second member, and
    wherein the predetermined wavelength range is a range having a longer wavelength than the wavelength of a longer wavelength of light of the two wavelengths of light.

14. A diffractive element on which two wavelengths of light are incident from a light source, the diffractive element transmitting one of the two wavelengths of light to one type optical disc, the diffractive element splitting the other wavelength of light and emitting the split light to another type optical disc, the diffractive element comprising:
- a first member including a first resin and having a predetermined refractive index, and
- a second member having the same refractive index as the first member in the one wavelength of light and having a refractive index different from the first member in the other wavelength of light,
- wherein the first member and the second member are alternately arranged in a right-and-left direction with respect to an incidence direction of the two wavelengths of light, thereby constituting a diffraction grating,
- wherein the second member includes a second resin to dissolve organic matter having optical absorption in a predetermined wavelength range at a molecular level so as to form the refractive index of the second member, and
- wherein at least one of the first member and the second member has a water absorption coefficient of 2% or less.

15. A diffractive element on which laser light for DVDs and laser light for CDs are incident from a laser light source and that transmits the laser light for DVDs and splits the laser light for CDs and emits the split laser light to an optical disc, the diffractive element comprising:
- a first member including a first resin and having a predetermined refractive index, and
- a second member having the same refractive index as the first member in the laser light for DVDs and having a refractive index different from the first member in the laser light for CDs,
- wherein the first member and the second member are alternately arranged in a horizontal direction to an incidence direction of the two wavelengths of light, thereby constituting a diffraction grating, and
- wherein the second member includes organic matter having optical absorption in a predetermined wavelength range and a second resin to dissolve the organic matter at a molecular level so as to form the refractive index of the second member, wherein the organic matter is a dye, not a pigment.

16. An optical pickup device comprising a laser light source that emits laser light for DVDs and laser light for CDs and a diffractive element that transmits the laser light for DVDs and splits the laser light for CDs and emits the split laser light to an optical disc, the diffractive element including:
- a first member including a first resin and having a predetermined refractive index, and
- a second member having the same refractive index as the first member in the laser light for DVDs and having a refractive index different from the first member in the laser light for CDs,
- wherein the first member and the second member are alternately arranged in a horizontal direction to an incidence direction of the two wavelengths of light, thereby constituting a diffraction grating, and
- wherein the second member includes organic matter having optical absorption in a predetermined wavelength range and a second resin to dissolve the organic matter at a molecular level so as to form the refractive index of the second member, wherein the organic matter is a dye, not a pigment.

17. An optical disc apparatus comprising a laser light source that emits laser light for DVDs and laser light for CDs and a diffractive element that transmits the laser light for DVDs and splits the laser light for CDs and emits the split laser light to an optical disc, the diffractive element including:
- a first member including a first resin and having a predetermined refractive index, and
- a second member having the same refractive index as the first member in the laser light for DVDs and having a refractive index different from the first member in the laser light for CDs,
- wherein the first member and the second member are alternately arranged in a horizontal direction to an incidence direction of the two wavelengths of light, thereby constituting a diffraction grating, and
- wherein the second member includes organic matter having optical absorption in a predetermined wavelength range and a second resin to dissolve the organic matter at a molecular level so as to form the refractive index of the second member, wherein the organic matter is a dye, not a pigment.

* * * * *